US012479750B2

(12) United States Patent
Stroud et al.

(10) Patent No.: US 12,479,750 B2
(45) Date of Patent: Nov. 25, 2025

(54) SUPERCRITICAL OXIDATION OF WASTE

(71) Applicant: Beyond the Dome Inc., San Francisco, CA (US)

(72) Inventors: Matthew Brandon Stroud, Penngrove, CA (US); Sophie Mancuso, Redwood City, CA (US)

(73) Assignee: Beyond the Dome, Inc., Petaluma, CA (US)

( * ) Notice: Subject to any disclaimer, the term of this patent is extended or adjusted under 35 U.S.C. 154(b) by 937 days.

(21) Appl. No.: 17/687,515

(22) Filed: Mar. 4, 2022

(65) Prior Publication Data
US 2022/0185713 A1 Jun. 16, 2022

Related U.S. Application Data

(63) Continuation of application No. 16/504,059, filed on Jul. 5, 2019, now Pat. No. 11,292,738.

(60) Provisional application No. 62/694,900, filed on Jul. 6, 2018.

(51) Int. Cl.
C02F 11/08 (2006.01)
C02F 1/74 (2023.01)

(52) U.S. Cl.
CPC .............. *C02F 11/086* (2013.01); *C02F 1/74* (2013.01); *C02F 2303/10* (2013.01)

(58) Field of Classification Search
None
See application file for complete search history.

(56) References Cited

U.S. PATENT DOCUMENTS

| | | | |
|---|---|---|---|
| 3,661,778 A | 5/1972 | Pradt et al. |
| 3,876,497 A | 4/1975 | Hoffman |
| 3,876,536 A | 4/1975 | Pradt et al. |
| 3,977,966 A | 8/1976 | Pradt et al. |
| 4,100,730 A | 7/1978 | Pradt |
| 4,113,446 A | 9/1978 | Modell et al. |
| 4,141,829 A | 2/1979 | Thiel et al. |

(Continued)

FOREIGN PATENT DOCUMENTS

| | | |
|---|---|---|
| JP | S51148266 A | 12/1976 |
| JP | S574225 A | 1/1982 |

(Continued)

OTHER PUBLICATIONS

Alonso, M.J.A., et al., "Supercritical Water Oxidation of Wastewater and Sludges—Design Considerations," Eng. Life Sci., vol. 2, No. 7, 2002, pp. 195-200.

(Continued)

*Primary Examiner* — Jonathan M Peo
(74) *Attorney, Agent, or Firm* — Weaver Austin Villeneuve & Sampson LLP

(57) ABSTRACT

Provided herein are methods, systems, and apparatuses for energy-efficient supercritical water oxidation of waste. The supercritical water oxidation processes and systems described herein may incorporate one or more of the following features: compression of large amounts of oxidant for plant-scale operations in an energy-efficient manner; the use of air as an oxidant; using reactor effluent to drive a turbine or other gas expander for energy recovery; and recovery of pressure and heat of reactor effluent. In some embodiments, the systems and methods are energy-neutral or energy-positive.

23 Claims, 14 Drawing Sheets

(56) References Cited

U.S. PATENT DOCUMENTS

| | | | |
|---|---|---|---|
| 4,174,280 A | 11/1979 | Pradt et al. | |
| 4,241,722 A | 12/1980 | Dickinson | |
| 4,284,015 A | 8/1981 | Dickinson | |
| 4,292,953 A | 10/1981 | Dickinson | |
| 4,338,199 A * | 7/1982 | Modell | C02F 11/086 |
| | | | 210/721 |
| 4,543,190 A | 9/1985 | Modell | |
| 4,564,458 A | 1/1986 | Burleson | |
| 4,692,252 A | 9/1987 | Atwood et al. | |
| 4,713,177 A | 12/1987 | Atwood et al. | |
| 4,822,497 A | 4/1989 | Hong et al. | |
| 4,869,833 A | 9/1989 | Binning et al. | |
| 4,898,107 A | 2/1990 | Dickinson | |
| 5,100,560 A | 3/1992 | Huang | |
| 5,252,224 A | 10/1993 | Modell et al. | |
| 5,501,799 A | 3/1996 | Bond et al. | |
| 5,682,738 A * | 11/1997 | Barber | F02G 3/02 |
| | | | 60/39.63 |
| 5,743,080 A | 4/1998 | Ginter | |
| 5,746,926 A | 5/1998 | Ross et al. | |
| 5,888,389 A | 3/1999 | Griffith et al. | |
| 6,051,145 A | 4/2000 | Griffith et al. | |
| 6,103,129 A * | 8/2000 | Bond | C02F 11/08 |
| | | | 210/721 |
| 11,292,738 B2 | 4/2022 | Stroud et al. | |
| 11,459,260 B2 | 10/2022 | Zhang et al. | |
| 2006/0064986 A1 | 3/2006 | Ginter et al. | |
| 2008/0283472 A1 | 11/2008 | Scott et al. | |
| 2009/0266772 A1 | 10/2009 | Martinez De La Ossa Fernandez et al. | |
| 2012/0279227 A1 | 11/2012 | Timmins et al. | |
| 2020/0010349 A1 | 1/2020 | Stroud et al. | |
| 2020/0277213 A1 | 9/2020 | Nagar et al. | |
| 2024/0150209 A1 | 5/2024 | Stroud | |

FOREIGN PATENT DOCUMENTS

| | | |
|---|---|---|
| JP | H09201590 A | 8/1997 |
| JP | 2001524871 A | 12/2001 |
| JP | 2015093231 A | 5/2015 |
| JP | 2017529478 A | 10/2017 |
| WO | WO-2012177907 A1 | 12/2012 |

OTHER PUBLICATIONS

Benjumea, J.M., "Temperature control in a supercritical water oxidation reactor: Assessing strategies for highly concentrated wastewaters," J. of Supercritical Fluids, vol. 119, 2017, pp. 72-80.

Berkeley, D. F., "Ejectors Have a Wide Range of Uses," Reprinted from Petroleum Refiner, Dec. 1958, pp. 1-6.

Berkeley, R. D., "Ejectors Give Any Suction Pressure," Chemical Engineering, Apr. 1957, pp. 1-7.

Bermejo, M.D., et al., "A process for generating power from the oxidation of coal in supercritical water," Fuel, vol. 83, 2004, pp. 195-204.

Birgenheier, D.B., et al., Designing Steam Jet Vacuum Systems, Reprinted from Chemical Engineering, Jul. 1993, pp. 1-7.

Bond, W.N., "The Viscosity of Air," The Proceedings of the Physical Society, IOPScience, vol. 49, Part 3, No. 272, May 1, 1937, 10 pages.

Calzavara, Y., et al., "A New Reactor Concept for Hydrothermal Oxidation," J. of Supercritical Fluids, vol. 31, 2004 pp. 195-206.

Chen, Z., et al., "A new system design for supercritical water oxidation," Chemical Engineering Journal, vol. 269, 2015, pp. 343-351.

Cocero, M. J., "Supercritical Water Oxidation (SCWO) Application to Industrial Wastewater Treatment," pp. 509-526.

Cocero, M.J., et al., "Study of alternatives for the design of a mobile unit for wastewater treatment by supercritical water oxidation," J. Chem. Technol. Biotechnol., vol. 76, 2001, pp. 257-264.

Dennis, M., et al., "A prescription for primary nozzle diameters for solar driven ejectors," Solar Energy, vol. 115, 2015, pp. 405-412.

Dulaney, J., "EnerTech Energy Plant in Rialto Closes," The Sun, Posted Nov. 1, 2012, 6 pages.

Elbel, S., et al., "Vapor Jet Ejector Used to Generate Free Waste Heat Driven Cooling in Military Environmental Cooling Units," International Refrigeration and Air Conditioning Conference at Purdue, Jul. 16-19, 2012, 10 pages.

EnerTech Environmental, Inc. 2008, "Reviews of the SlurryCarb™ Process," 16 pages.

Fauvel, E., et al., "A double-wall reactor for hydrothermal oxidation with supercritical water flow across the inner porous tube," J. of Supercritical Fluids, vol. 28, 2004, pp. 47-56.

Greenspan, L., "Functional Equations for the Enhancement Factors for CO2—Free Moist Air," Journal of Research of the National Bureau of Standards—A. Physics and Chemistry, vol. 80A, No. 1, Jan.-Feb. 1976, pp. 41-44.

Heberle, J.R., et al., "Coal Energy Conversion via Combustion in Supercritical Aquifer Water: An Approach to Electric Power Generation without Atmospheric Emissions," Advanced Energy Systems Laboratory, Department of Mechanical Engineering, Stanford University, 1 page.

Hodes, M., et al., "Salt precipitation and scale control in supercritical water oxidation—Part A: fundamentals and research," The Journal of Supercritical Fluids, vol. 29, 2004, pp. 265-288.

International Preliminary Report on Patentability Jan. 12, 2021 in PCT Application No. PCTUS2019040704.

International Search Report and Written Opinion dated Nov. 15, 2019, in PCTUS2019040704.

Kadoya, N., et al., "Viscosity and Thermal Conductivity of Dry Air in the Gaseous Phase," J. Phys. Chem Ref. Data, vol. 14, No. 4, 1985, pp. 947-970.

Kritzer, P., et al., "An assessment of supercritical water oxidation (SCWO) Existing problems, possible solutions and new reactor concepts," Chemical Engineering Journal, vol. 83, 2001, pp. 207-214.

Körting Hannover AG, "Design Features and Operation of Jet Ejectors," 2 pages.

Lemmon, E. W., et al., "Thermodynamic Properties of Air and Mixtures of Nitrogen, Argon, and Oxygen from 60 to 2000 K at Pressures to 2000 MPa," J. Phys. Chem Ref. Data, vol. 29, No. 3, 2000, pp. 331-385.

M. Conde Engineering, 2007, "Thermophysical Properties of Humid Air, Models and Background," Properties of Working Fluids—Moist Air, 24 pages.

Marrone, P.A., et al., "Supercritical Water Oxidation," Chapter 13, Environmentally Conscious Materials and Chemicals Processing, © 2007, ISBN: 978-0-471-73904-3, pp. 385-453.

Mitchell, J.W., "Design Parameters for Subsonic Air-Air Ejectors," Department of Mechanical Engineering, Stanford University, Technical Report No. 40, 64 pages.

Morvay, Z.K., et al., "Thermodynamic and Transport Properties of Moist Air," applied Industrial Energy and Environmental Management, Part III, Fundamentals for Analysis and Calculation of Energy and Environmental Performance, 5 pages.

Notice of Allowance dated Feb. 23, 2022 issued in U.S. Appl. No. 16/504,059.

Office Action dated Jan. 12, 2022 issued in U.S. Appl. No. 16/504,059.

Office Action dated Jul. 2, 2022 issued in U.S. Appl. No. 16/504,059.

Polyakov, A.F., "Heat Transfer under Supercritical Pressures," Advance in Heat Transfer, vol. 21, 1991, pp. 1-53.

Queiroz, J.P.S., "Supercritical water oxidation with hydrothermal flame as internal heat source: Efficient and clean energy production from waste," J. of Supercritical Fluids, vol. 96, 2015, pp. 103-113.

Ross, D.S., et al., "On-Site Disposal of Hazardous Waste via Assisted Hydrothermal Oxidation," Rev. High Pressure Sc. Technol., vol. 7, 1998, pp. 1386-1388.

Schleicher, R., et al., "An Assessment of the Brayton Cycle for High Performance Power Plants," undated, 5 pages.

Schlueb, M., "Reactor blowout sidelines Orlando's waste-to-energy hopes," Orlando Sentinel, May 15, 2014, 3 pages.

(56) References Cited

OTHER PUBLICATIONS

Sloan, D.S., et al., "Sludge Management in the City of Orlando—It's Supercritical!," Jun. 2008, Florida Water Resources Journal, pp. 46-54.
Solid Waste.com, "Mitsubishi to Use SRI's AHO Technology," New, Nov. 18, 1998, 1 page.
Tsilingiris, P.T., "Thermophysical and transport properties of humid air at temperature range between 0 and 100oC," Energy Conversion and Management, vol. 49, 2008, pp. 1098-1110.
U.S. Department of Energy, "Replace Pressure-Reducing Valves with Backpressure Turbogenerators," Advanced Manufacturing Office, Energy Efficiency & Renewable Energy, Jan. 2012, 2 pages.
Vadillo, V., et al., "Problems in Supercritical Water Oxidation Process and Proposed Solutions," Ind. Eng. Chem. Res., 2013, vol. 52, pp. 7617-7629.
EP Office Action dated Feb. 1, 2024 in EP Application No. 19753486.
International Preliminary Report on Patentability and Written Opinion dated Apr. 29, 2025 in PCT Application No. PCT/US2023/078980.
International Search Report and Written Opinion dated Feb. 15, 2024 in PCT Application No. PCT/US2023/078980.
JP Office Action dated Aug. 8, 2023, in Application No. JP2021-521947 with English translation.
KR Office Action dated Jan. 10, 2025 in KR Application No. 10-2021-7003799, with English Translation.
CA Office Action dated Jun. 16, 2025 in CA Application No. 3,105,642.

\* cited by examiner

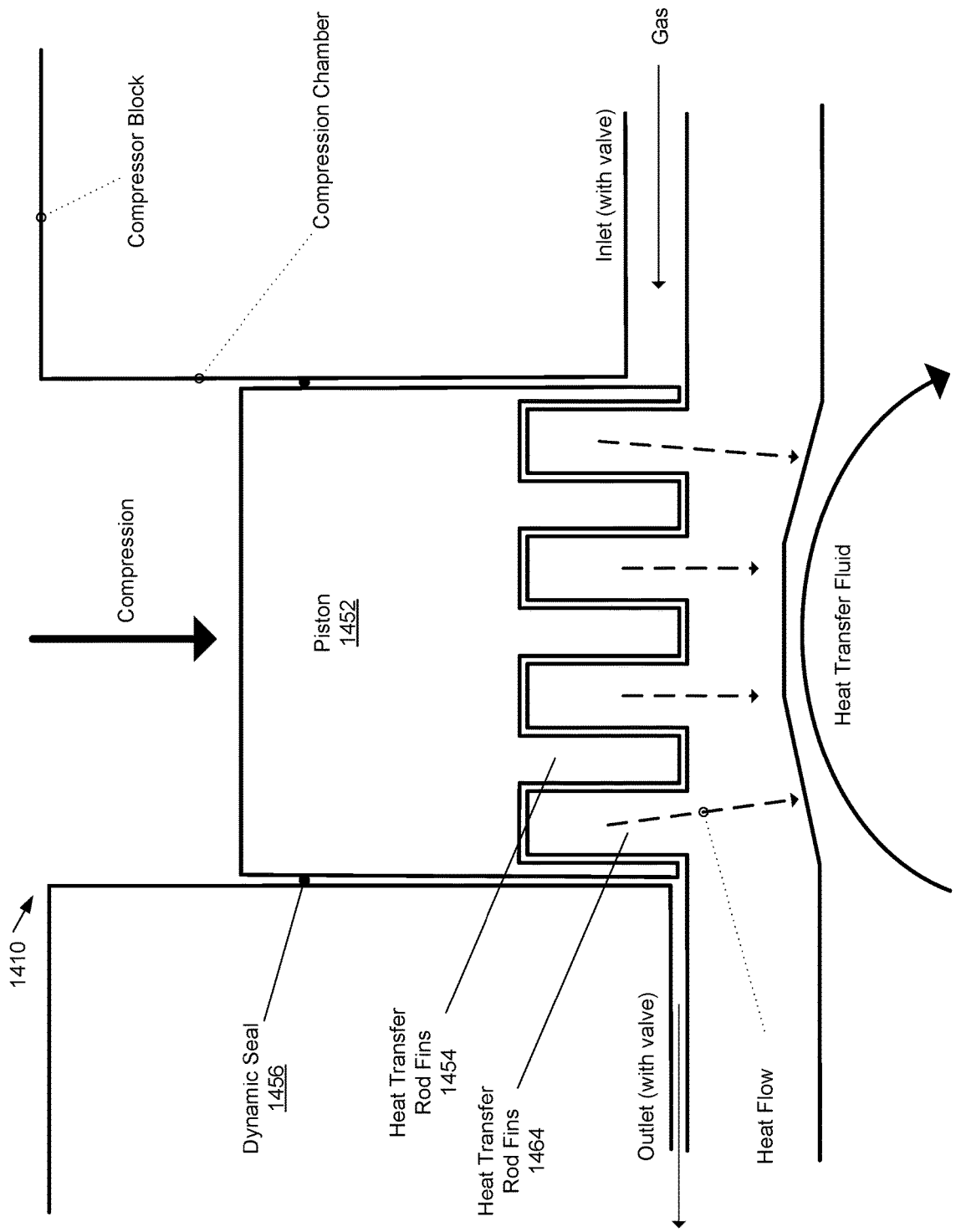

SUPERCRITICAL OXIDATION OF WASTE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Wastewater treatment is the process of converting wastewater to a treated effluent that can be returned to the water cycle or otherwise used and typically involves several treatment steps. For example, treatment of sewage may involve pretreatment followed by two or three treatment operations. In a pretreatment step, large objects and grit may be removed. Pretreatment may also involve flow equalization to mitigate changes in the wastewater feed stream. The pretreated sewage flows through settling tanks to precipitate suspended solid matter, referred to as sludge. The sludge may include the suspended solids that were precipitated, as well as flocculant used to precipitate the solids and microorganisms used to degrade biological material. The sludge is then partially treated with anaerobic degradation, which produces treated sludge and methane. The treated sludge is dewatered, with the dewatered sludge referred to as biosolids.

Biosolids may be applied to land for beneficial use, go to landfill, or may be incinerated. Beneficial use is tightly regulated to ensure that toxic pollutants are not present; however, regulations are often focused on a narrow set of species, primarily metals and common pathogens. Newly identified toxins, frequently referred to as emerging contaminants may not be not be regulated and may not be removed by a particular technology. Examples of emerging contaminants include residual disinfectants, fire retardants, and medications such as synthetic hormones.

Biosolids may undergo anaerobic degradation, producing methane. Landfill space is limited and also produces methane. Methane can be used to generate power, but is frequently not used; when it is used, the power producing process is more complicated and dirtier than a traditional gas-based power producing process. Incineration produces pollutants and is energy intensive, requiring significant quantities of fuel. Given the limitations of beneficial use, landfill, incineration, and anaerobic degradation, it is desirable to have alternative methods of treating and reducing waste.

SUMMARY

Provided herein are methods, systems, and apparatuses for energy-efficient supercritical water oxidation of waste. The supercritical water oxidation processes and systems described herein may incorporate one or more of the following features: compression of large amounts of oxidant for operations, including plant-scale operations, in an energy-efficient manner; the use of air as an oxidant; using reactor effluent to drive a turbine or other gas expander for energy recovery; and recovery of pressure and heat of reactor effluent. In some embodiments, the systems and methods are energy-neutral or energy-positive. These features may be implemented in various combinations.

One aspect of the disclosure relates to a system including: a compressor configured to compress an oxidant stream; a supercritical reactor configured to generate waste solids and a reactor effluent from an aqueous supercritical waste feed stream and the compressed oxidant stream; and a gas expander configured to be driven by at least a portion of the reactor effluent. Examples of gas expanders include turbines, pistons, and scroll expanders. In some embodiments the compressor, the supercritical reactor, and the gas expander form a Brayton cycle engine. In some embodiments, the system includes a heat transfer loop configured to exchange heat between the compressor and the gas expander. In some embodiments, the system further includes a gas/liquid separator configured to separate components of the reactor effluent to form a pressurized gas phase reactor effluent stream to drive the gas expander. In some such embodiments, the system further includes a heat exchanger configured to exchange heat between the reactor effluent and the pressurized gas phase reactor effluent stream to heat the gas phase reactor effluent stream. In some embodiments, the gas expander is configured to be driven by the heated pressurized gas phase reactor effluent stream. In some such embodiments, the heat exchanger is a pressurized heat exchanger configured to exchange heat between a pressurized waste feed stream, the reactor effluent, and the pressurized gas reactor effluent stream to thereby heat the pressurized waste feed stream to supercritical conditions to form the supercritical waste stream and cool the reactor effluent to form a pressurized mixed phase reactor effluent.

In some embodiments, the oxidant stream includes $N_2$ and the at least portion of the reactor effluent includes the $N_2$. In some such embodiments, the system further includes a gas/liquid separator configured to separate components of the reactor effluent to form a pressurized gas phase reactor effluent stream including the $N_2$. In some embodiments, the portion of the reactor effluent that is expanded includes $CO_2$ generated in the reactor. In some embodiments, the gas expander is configured to be driven by a non-aqueous portion of the reactor effluent. In some embodiments, the system further includes a gas/liquid separator configured to remove water from the reactor effluent.

Another aspect of the disclosure relates to a method including compressing an oxidant stream; generating, in a supercritical reactor, waste solids and a reactor effluent from an aqueous supercritical waste feed stream and the compressed oxidant stream; and expanding at least a portion of the reactor effluent to generate work. In some embodiments, the method further includes exchanging heat between a compressor compressing the oxidant stream and a gas expander expanding the at least a portion of the reactor effluent. In some embodiments, the method further includes separating components of the reactor effluent to form a pressurized gas phase reactor effluent stream, wherein the pressurized gas phase reactor effluent stream is expanded to generate work. In some such embodiments, the method further includes exchanging heat between the reactor effluent and the pressurized gas phase reactor effluent stream to heat the gas phase reactor effluent stream. In some embodiments, the method further includes exchanging heat between a pressurized waste feed stream, the reactor effluent, and the pressurized gas reactor effluent stream to thereby heat the pressurized waste feed stream to supercritical conditions to form the aqueous supercritical waste stream and cool the reactor effluent to form a pressurized mixed phase reactor effluent. In some embodiments, the oxidant stream includes $N_2$ and the at least portion of the reactor effluent includes the $N_2$. In some such embodiments, the method further includes separating components of the reactor effluent to form a pressurized gas phase reactor effluent stream including the $N_2$. In some embodiments, at least portion of the reactor effluent includes $CO_2$ generated in the supercritical reactor. In some embodiments, the portion of the reactor effluent that is expanded is non-aqueous. In some embodiments, the method further includes removing water from the reactor effluent prior to expanding at least a portion of the reactor effluent. In some embodiments, the expander is driven by a mixed phase reactor effluent and to separate the mixed phase reactor effluent into a gas phase effluent and a liquid phase effluent.

Another aspect of the disclosure relates to a system for supercritical water oxidation of waste, the system including: a supercritical reactor configured to generate waste solids and a supercritical reactor effluent from a supercritical waste feed stream; a recovery heat exchanger in communication with the supercritical reactor and configured to cool the supercritical reactor effluent to form a pressurized mixed phase reactor effluent, the pressurized mixed phase reactor effluent including a pressurized liquid phase reactor effluent and a pressurized gas phase reactor effluent; and a pressure exchanger configured to depressurize the pressurized liquid phase reactor effluent and pressurize an aqueous waste feed stream. In some embodiments, the system further includes a gas/liquid separator configured to separate components of the pressurized mixed phase reactor effluent to form a pressurized liquid phase reactor effluent stream and a pressurized gas phase reactor effluent stream. In some such embodiments, the system further includes a gas expander configured to be driven by the pressurized gas phase reactor effluent. In some such embodiments, the gas expander is a turbine. In some embodiments, the pressurized gas phase reactor effluent stream is non-aqueous. In some such embodiments, the pressurized gas phase reactor effluent stream includes $N_2$. In some such embodiments, the pressurized gas phase reactor effluent includes $CO_2$ generated in the supercritical reactor. In some embodiments, the system further includes a compressor configured to compress an air stream and wherein the pressurized gas phase reactor effluent includes $N_2$ from the air stream. In some such embodiments, the compressor is configured to be driven by the gas expander. In some embodiments, the recovery heat exchanger is further configured to heat the pressurized gas phase reactor effluent. In some embodiments, system further includes a compressor configured to compress an oxidant stream and wherein the supercritical reactor is configured to receive the compressed oxidant. In some embodiments, the pressure exchanger comprises an expander connected to a pump. In some embodiments, the pressure comprises a direct interface pressure exchanger.

Another aspect of the disclosure relates to a method including generating waste solids and a supercritical reactor effluent from a supercritical waste feed stream; cooling the supercritical reactor effluent to form a pressurized mixed phase reactor effluent, the pressurized mixed phase reactor effluent including a pressurized liquid phase reactor effluent and a pressurized gas phase reactor effluent; and exchanging pressure between the pressurized liquid phase reactor effluent and an aqueous waste feed stream to pressurize the aqueous waste feed stream.

In some embodiments, the method further includes separating components of the pressurized mixed phase reactor effluent to form a pressurized liquid phase reactor effluent stream and a pressurized gas phase reactor effluent stream.

In some embodiments, the method further includes expanding the pressurized gas phase reactor effluent to generate work. In some embodiments, the pressurized gas phase reactor effluent stream is non-aqueous. In some embodiments, the pressurized gas phase reactor effluent stream includes $N_2$. In some embodiments, the pressurized gas phase reactor effluent includes $CO_2$. In some embodiments, the method further includes compressing an air stream and wherein the pressurized gas phase reactor effluent includes $N_2$ from the air stream.

In some embodiments, the method further includes heating the pressurized gas phase reactor effluent. In some such embodiments, heating the pressurized gas phase reactor effluent includes exchanging heat between the pressurized gas phase reactor effluent includes and the supercritical reactor effluent. In some embodiments, the expander is configured to be driven by a mixed phase reactor effluent and to separate the mixed phase reactor effluent into a gas phase effluent and a liquid phase effluent.

Another aspect of the disclosure relates to a method that includes generating a supercritical aqueous fluid including organic waste from aqueous feed stream at ambient temperature and pressure; compressing an oxidant from ambient pressure to a pressure near or at the pressure of the supercritical aqueous fluid; inletting the supercritical aqueous fluid and the compressed oxidant to a supercritical reactor; oxidizing the organic waste in the supercritical aqueous fluid; and outputting solids, $H_2O$, and $CO_2$ from the reactor, wherein the method is energy-neutral or energy-positive. In some embodiments, the oxidant is air and $N_2$ is output from the reactor.

Another aspect of the disclosure relates to a system for supercritical oxidation of waste, including: a compressor configured to compress air; a supercritical reactor configured to receive a supercritical aqueous waste feed stream and compressed air and generate waste solids and a supercritical reactor effluent including $H_2O$, $CO_2$, and $N_2$; a recovery heat exchanger system in communication with the supercritical reactor and configured to exchange heat between a pressurized aqueous waste feed stream and the supercritical reactor effluent to thereby: heat the pressurized aqueous waste feed stream to supercritical or near-supercritical conditions to form the supercritical aqueous waste feed stream; and cool the supercritical reactor effluent to form a pressurized mixed phase reactor effluent; a gas/liquid separator in communication with the recovery heat exchanger system and configured to receive and separate the pressurized mixed phase reactor effluent to form a pressurized liquid phase reactor effluent stream including $H_2O$ and a pressurized gas phase reactor effluent stream; a pressure exchanger in communication with the gas/liquid separator and configured to exchange pressure between the pressurized liquid phase reactor effluent stream and an aqueous waste feed stream to pressurize the aqueous waste feed stream and form the pressurized aqueous waste feed stream; and a turbine or other gas expander configured to be driven by the pressurized gas phase reactor effluent stream and configured to drive the compressor.

In some embodiments, the system further includes a second heat exchanger system upstream of the turbine or other gas expander and in communication with the supercritical reactor and the recovery heat exchanger system and configured to exchange heat between the supercritical reactor effluent and the pressurized gas phase reactor effluent stream to heat the pressurized gas phase reactor effluent stream. In some embodiments, the system further includes piping configured to pipe compressed air from the compressor to the heated pressurized gas phase reactor effluent stream upstream of the second heat exchanger system.

In some embodiments, the recovery heat exchanger system is further configured to exchange heat with a pressurized gas phase reactor effluent stream to heat the pressurized gas phase reactor effluent stream. In some embodiments, the pressurized liquid phase reactor effluent stream further includes $CO_2$. In some such embodiments, the system further includes a $CO_2$/liquid separator in communication with the pressure exchanger and configured to receive the pressurized liquid phase reactor effluent stream and separate $CO_2$ from $H_2O$ after the pressurized liquid phase reactor effluent stream is depressurized in the pressure exchanger. In some embodiments, the pressurized gas phase reactor effluent stream includes $N_2$. In some embodiments, the pressurized gas phase reactor effluent stream includes $CO_2$.

In some embodiments, the gas/liquid separator is configured to return the pressurized liquid phase reactor effluent stream including $H_2O$ to the recovery heat exchanger system for further cooling. In some embodiments, the gas/liquid separator is configured to return the pressurized gas phase reactor effluent stream to the recovery heat exchanger system for heating. In some embodiments, the system further includes one or more auxiliary flow streams configured for one or more of the following: diluting the aqueous waste feed stream, cooling the pressurized liquid phase reactor effluent, balancing the system thermally, and cleaning the system during operation.

In some embodiments, the pressure exchanger is fluid-tight such that the liquid phase reactor effluent stream and an aqueous waste feed stream do not mix. In some embodiments, the recovery heat exchanger system includes multiple heat exchangers. In some embodiments, the system further includes a heater downstream of the recovery heat exchanger system and upstream of or incorporated into the supercritical reactor configured to heat the supercritical aqueous waste feed stream.

Another aspect of the disclosure relates to a method including: compressing an air stream; inletting the compressed air stream and a supercritical aqueous waste feed stream to a supercritical reactor; generating waste solids and a supercritical reactor effluent in the supercritical reactor; exchanging heat between the supercritical reactor effluent and a pressurized aqueous waste feed stream to cool the supercritical reactor effluent to thereby form a pressurized mixed phase reactor effluent and heat the pressurized aqueous waste feed stream to thereby for the supercritical aqueous waste feed stream; separating the pressurized mixed phase reactor effluent to form a pressurized gas phase reactor effluent stream and a pressurized liquid phase reactor effluent stream, the pressurized liquid phase reactor effluent stream includes $H_2O$; exchanging pressure between the pressurized liquid phase reactor effluent stream and an aqueous waste feed stream to depressurized the liquid phase reactor effluent stream and pressurize the aqueous waste feed stream and form the pressurized aqueous waste feed stream; and inletting the pressurized gas phase reactor effluent stream to a turbine or other gas expander to drive the turbine or other gas expander and generate work, wherein the work is used to compress the air stream.

In some embodiments, the method further includes heating the pressurized gas phase reactor effluent stream prior to inletting it to the turbine or other gas expander. In some such embodiments, heating the pressurized gas phase reactor effluent stream includes exchanging heat with the supercritical reactor effluent. In some embodiments, the method further includes adding compressed air to the pressurized gas phase reactor effluent stream prior to inletting it to the turbine or other gas expander. In some embodiments, the pressurized liquid phase reactor effluent stream further includes $CO_2$. In some such embodiments, the method further includes separating the $CO_2$ from $H_2O$ after the pressurized liquid phase reactor effluent stream is depressurized. In some embodiments, the pressurized gas phase reactor effluent stream includes $N_2$. In some embodiments, the pressurized gas phase reactor effluent stream includes $CO_2$.

In some embodiments, the method further includes adding one or more auxiliary flow streams for one or more of: diluting the aqueous waste feed stream, cooling the pressurized liquid phase reactor effluent, balancing the system thermally, and cleaning during operation.

Another aspect of the disclosure relates to a system for supercritical oxidation of waste, comprising: a compressor configured to compress air; a supercritical reactor configured to receive a supercritical aqueous waste feed stream and compressed air and generate waste solids and a supercritical reactor effluent comprising $H_2O$, $CO_2$, and $N_2$; a recovery heat exchanger system in communication with the supercritical reactor and configured to exchange heat between a pressurized aqueous waste feed stream and the supercritical reactor effluent to thereby: heat a pressurized aqueous waste feed stream to supercritical or near-supercritical conditions to form the supercritical aqueous waste feed stream; and cool the supercritical reactor effluent to form a pressurized mixed phase reactor effluent; a gas expander configured to be driven by the pressurized mixed phase reactor effluent stream; a pump configured to pressurize an aqueous waste feed stream and form the pressurized aqueous waste feed stream; and a motor/generator connected to the gas expander, compressor, and pump.

Examples of aqueous waste feed streams that may be treated by the methods and systems described herein include wastewater, sewage sludge, and biosolids, food waste, organic medical waste, and inorganic waste.

Another aspect of the disclosure relates to a system comprising: a compressor configured to compress an oxidant stream; a reactor configured to generate waste solids and a reactor effluent from an aqueous waste feed stream and the compressed oxidant stream; and a gas expander configured to be driven by at least a portion of the reactor effluent.

Examples of gas expanders include turbines, piston expanders, and scroll expanders. In some embodiments the compressor, the supercritical reactor, and the gas expander form a Brayton cycle engine. In some embodiments, the system includes a heat transfer loop configured to exchange heat between the compressor and the gas expander. In some embodiments, the system further includes a gas/liquid separator configured to separate components of the reactor effluent to form a pressurized gas phase reactor effluent stream to drive the gas expander. In some such embodiments, the system further includes a heat exchanger configured to exchange heat between the reactor effluent and the pressurized gas phase reactor effluent stream to heat the gas phase reactor effluent stream. In some embodiments, the gas expander is configured to be driven by the heated pressurized gas phase reactor effluent stream. In some such embodiments, the heat exchanger is a pressurized heat exchanger configured to exchange heat between a pressurized waste feed stream, the reactor effluent, and the pressurized gas reactor effluent stream to thereby heat the pressurized waste feed stream to form the waste stream and cool the reactor effluent to form a pressurized mixed phase reactor effluent.

In some embodiments, the oxidant stream includes $N_2$ and the at least portion of the reactor effluent includes the $N_2$. In some such embodiments, the system further includes a gas/liquid separator configured to separate components of the reactor effluent to form a pressurized gas phase reactor effluent stream including the $N_2$. In some embodiments, the portion of the reactor effluent that is expanded includes $CO_2$ generated in the reactor. In some embodiments, the gas expander is configured to be driven by a non-aqueous portion of the reactor effluent. In some embodiments, the system further includes a gas/liquid separator configured to remove water from the reactor effluent.

Another aspect of the disclosure relates to a method comprising compressing an oxidant stream; generating, in a reactor, waste solids and a reactor effluent from a waste feed stream and the compressed oxidant stream; and expanding at least a portion of the reactor effluent to generate work. In some embodiments, the reaction may be at sub-supercritical pressures such that the reactor effluent is at sub-supercritical pressure.

The method may further include separating components of the reactor effluent to form a pressurized gas phase reactor effluent stream, wherein the pressurized gas phase reactor effluent stream is expanded to generate work. In some embodiments, the method further includes exchanging heat between a compressor compressing the oxidant stream and a gas expander expanding the at least a portion of the reactor effluent. In some embodiments, the method further includes separating components of the reactor effluent to form a pressurized gas phase reactor effluent stream, wherein the pressurized gas phase reactor effluent stream is expanded to generate work. In some such embodiments, the method further includes exchanging heat between the reactor effluent and the pressurized gas phase reactor effluent stream to heat the gas phase reactor effluent stream. In some embodiments, the method further includes exchanging heat between a pressurized waste feed stream, the reactor effluent, and the pressurized gas reactor effluent stream to thereby heat the pressurized waste feed stream to form the aqueous supercritical waste stream and cool the reactor effluent to form a pressurized mixed phase reactor effluent. In some embodiments, the oxidant stream includes $N_2$ and the at least portion of the reactor effluent includes the $N_2$. In some such embodiments, the method further includes separating components of the reactor effluent to form a pressurized gas phase reactor effluent stream including the $N_2$. In some embodiments, at least portion of the reactor effluent includes $CO_2$ generated in the reactor. In some embodiments, the portion of the reactor effluent that is expanded is non-aqueous. In some embodiments, the method further includes removing water from the reactor effluent prior to expanding at least a portion of the reactor effluent. In some embodiments, the expander is driven by a mixed phase reactor effluent and to separate the mixed phase reactor effluent into a gas phase effluent and a liquid phase effluent.

These and other features of the disclosure will be presented below with reference to the associated drawings.

BRIEF DESCRIPTION OF THE DRAWINGS

FIG. 14 shows a schematic example of a compressor that may be employed in implementations of the systems described herein.

DETAILED DESCRIPTION

Provided herein are methods, systems, and apparatuses for energy-efficient supercritical water oxidation of waste. The supercritical water oxidation processes and systems described herein may incorporate one or more of the following features: compression of large amounts of oxidant in an energy-efficient manner for plant-scale and smaller-scale operations; the use of air as an oxidant; using reactor effluent to drive a gas expander for energy recovery; and recovery of pressure and heat of reactor effluent. These features may be implemented in any appropriate combination. For example, a system may be configured for the use of air as oxidant and for reactor effluent to drive a gas expander and/or recovery of pressure and heat of the reactor effluent.

While much of the description below is presented in terms of treatment of wastewater that includes organic waste, the processes, systems, and apparatus described herein may be applied to treatment of any type of inorganic or organic waste that can be oxidized. Moreover, the processes, systems, and apparatuses may be implemented with waste that has or has not undergone previous treatment operations. Additional examples of waste feeds that may be treated using the methods, systems, and apparatuses described herein are provided further below.

Figure 1:
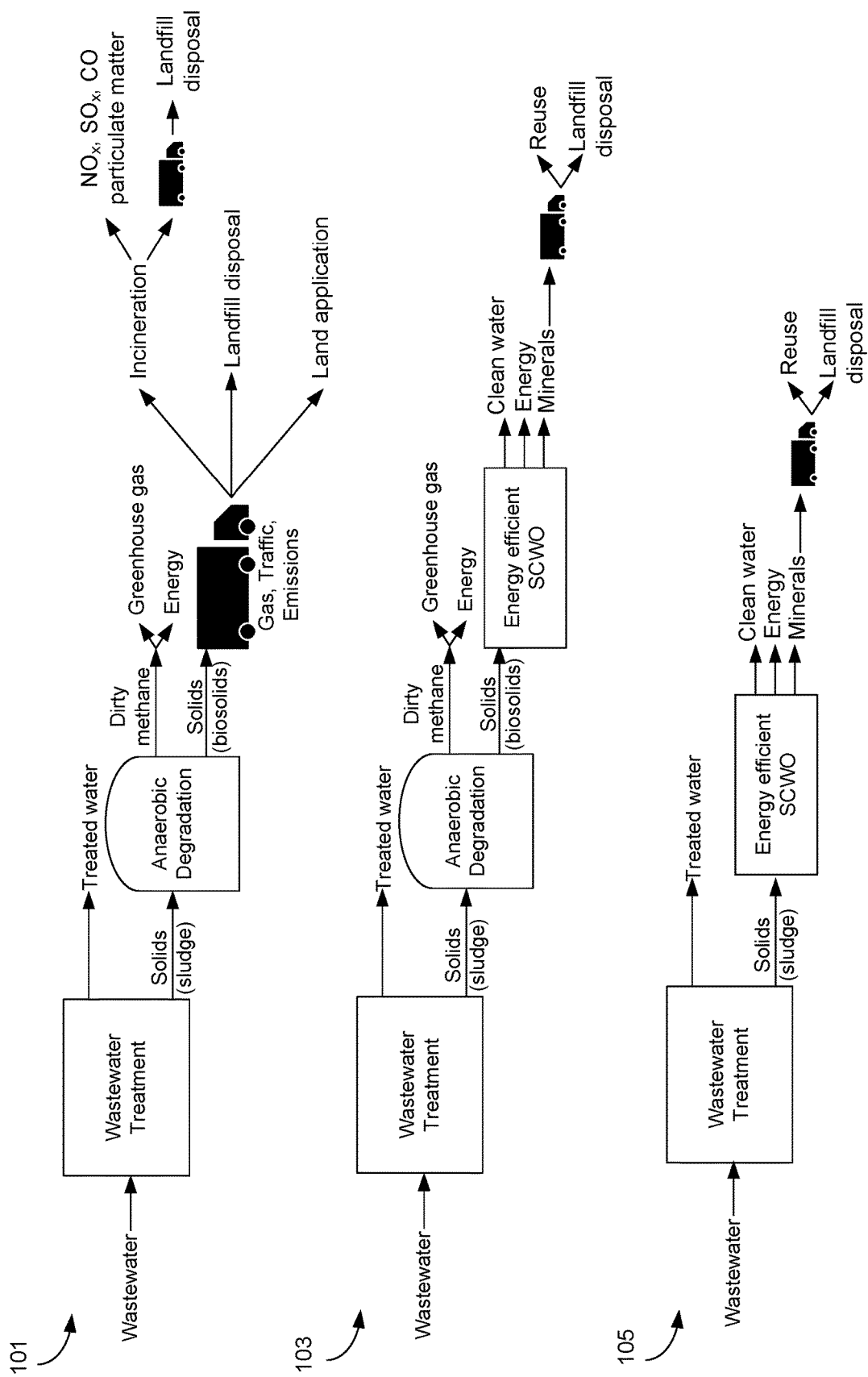
FIG. 1 shows examples of applications for the energy-efficient processes, systems, and apparatuses for supercritical water oxidation of waste described herein.

FIG. 1 shows examples of how the energy-efficient processes, systems, and apparatuses for supercritical water oxidation of waste described herein may be implemented. At 101, an example of wastewater treatment process without supercritical oxidation is illustrated. The wastewater treatment process shown in FIG. 1 may be performed at a municipal wastewater treatment plant, for example.

Wastewater is treated to produce treated water and sludge, a semi-solid material or slurry that may include 1-5% organic content by mass. In some instances, sludge is partially treated by biological degradation to produce methane. The remaining solids may be referred to as biosolids, and include organic matter and micro-organisms used in the degradation process.

Biosolids may include 12-18% and higher organic content by mass and may be removed from the wastewater plant by trucking, which as indicated in FIG. 1, leads to fuel consumption, traffic, and harmful emissions. The transported biosolids may be incinerated, disposed in landfill, or applied to land for beneficial use. Incineration creates pollutants including $NO_x$, $SO_x$, CO, and particulates. Landfill disposal takes space, produces methane, and may lead to leaching into groundwater. Land application also produces methane, and may spread contaminants such as heavy metals, dioxins, and emerging contaminants onto land.

At 103, an example of how the processes and systems described herein may be implemented is illustrated. In this example, the biosolids produced by anaerobic degradation may be treated by energy efficient supercritical water oxidation (SCWO) as described herein. This produces clean water and minerals. A small amount of carbon dioxide is produced when oxidizing organic matter and that may be exhausted or captured for industrial use. The minerals may be transported for reuse or landfill disposal. Notably, the amount of material that may be disposed in a landfill is significantly less than in the example shown at 101. Oxidation of the organic material in the biosolids is an exothermic reaction and produces energy. The energy produced by the supercritical oxidation of the biosolids recovered is described further below. In some embodiments, the energy efficient SCWO process is energy neutral or energy positive.

At 105, another example of how the processes and systems described herein may be implemented in the context of wastewater treatment is provided. In this example, sewage sludge is treated by energy efficient SCWO to produce clean water, energy, and minerals as described above.

While FIG. 1 provides two examples of implementing supercritical water oxidation processing in waste treatment, it also may be used to treat the incoming wastewater itself as well as in industrial processing, agricultural processing, or other municipal applications for a variety of inorganic or organic waste feeds.

Supercritical water oxidation involves reacting an oxidant and the waste to be oxidized in an aqueous mixture at supercritical conditions, i.e., at a temperature and pressure above the aqueous mixture's critical point. Above its critical point, the mixture is a single-phase fluid with unique properties that facilitate oxidation. While subcritical water is a polar solvent, supercritical water behaves more like a nonpolar solvent. As a result, nonpolar compounds such as hydrocarbons, oxygen ($O_2$), and nitrogen ($N_2$) are highly soluble in aqueous supercritical environments while polar compounds such as inorganic salts are much less soluble.

To date, supercritical water oxidation has not been practical for large-scale applications due in part to the challenge of providing an oxidant. The critical temperature and pressure of water is 374° C. and 3200 psia. Pure oxygen may require storage in liquid form and is costly to generate and provide. Air can be provided more easily but requires large compressors and a large amount of energy to compress it; for example, in some application, an 8 gallon per minute (gpm) feed, 1 megawatt (MW) of energy may be used to provide sufficient air to the reactor. Due in large part to the energy requirement, the cost of supercritical water oxidation for waste treatment using current technology is prohibitive for many potential applications.

Another challenge in supercritical water oxidation is the presence of inorganic salts and other polar species, which are less soluble in supercritical water. This leads to corrosion and plugging from accumulated precipitated salts.

Provided herein are energy efficient processes, systems, and apparatuses for the supercritical water oxidation of waste that enable implementation for large scale applications including municipal and industrial waste treatment. The processes and systems may recover energy from the waste feed itself. While the oxidation of organic materials is an exothermic reaction that generates energy, recovering that energy from a reactor effluent is challenging due to the nature of supercritical water. As pressure is dropped, for example, and supercritical water becomes steam, the solubility of salt decreases and can cause salt to precipitate. This precipitation presents a difficulty for turbines, for example, which have low tolerance for salts. Although supercritical water has less dissolved salts than liquid water, it dissolves several magnitudes more salt than existing turbines can handle.

According to various embodiments, the processes and systems described herein have one or more of the following features: recovery of energy in supercritical reactor effluent using an expander; heat recovery followed by pressure recovery of the supercritical reactor effluent; recovery of heat and/or pressure of reactor effluent to raise the temperature and/or pressure of a waste feed stream; and energy efficient use of air or other gas as an oxidant by recovering compression energy. FIGS. 2-6 provide examples of systems for supercritical water oxidation of wastewater. While the examples in FIGS. 2-6 may include each of these features, it will be understood that these features may be used independently in certain embodiments.

Figure 2:
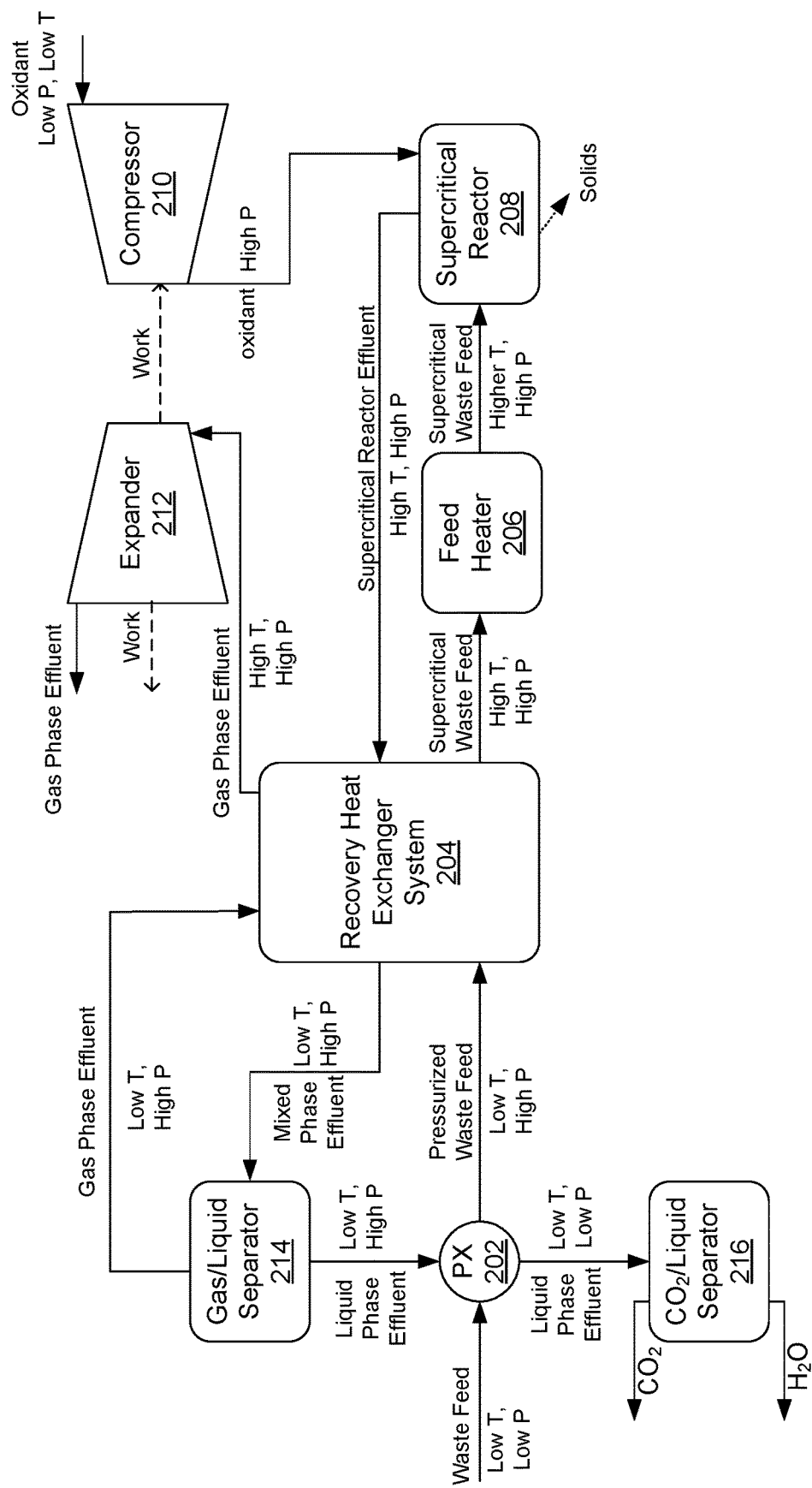
FIGS. 2-11 provide examples of systems for supercritical water oxidizing of wastewater.

In FIG. 2, a waste feed enters the system at low temperature and low pressure. The waste feed is any aqueous feed that includes waste to be oxidized. The waste may be organic or inorganic with particular examples provided further below. According to various embodiments, it may or may not have been previously treated. FIG. 1 shows examples of waste feed being sludge and biosolids; other examples include wastewater, agricultural waste, and industrial waste. The aqueous waste feed may be between 1 wt % and 15 wt % waste in some embodiments.

In the examples of FIGS. 2-11, various streams are labeled "low T", "low P", "high T", and "high P". Low temperature and low pressure typically refer to ambient or near ambient conditions and high temperature and high pressure typically refer to near or above the critical temperature and pressure, respectively. However, one having ordinary skill in the art will understand that the temperature and pressure may range depending on the efficiency of thermal balances, pressure drop across system components, etc. For example, the size of a recovery heat exchanger system in the below examples may be reduced by allowing some of the cooling to occur during expansion. "Low T" in an example may thus refer to a temperature in a low temperature range; "high T" to a temperature in a high temperature range, etc. such that the low temperatures within a particular example may vary in that range. In some embodiments, the system may include one or more auxiliary flows for dilution, flushing, cleaning, to balance the system thermally, and to add chemicals. The auxiliary flows may be at any appropriate place.

The waste feed stream may be entering at atmospheric conditions (e.g., approximately 25° C. and 14.7 psia). The waste feed stream is pressurized in a pressure exchanger (PX) 202 to produce a pressurized waste feed stream. As further described below, in the example described herein, the pressure exchanger 202 is used to recover pressure from the reactor effluent. However, in some embodiments, the waste feed stream may be pressurized using a pump instead of or in addition to the pressure exchanger 202. An auxiliary flow may be added to the waste feed stream prior to or after it is pressurized. The pressurized waste feed stream is then at low temperature but pressure above the critical point of water. In one example, the pressure is around 3500 psia.

The pressurized waste feed stream then enters a recovery heat exchanger system 204. The recovery heat exchanger system 204 includes one or more heat exchangers and is configured to recover heat from the supercritical reactor effluent. The pressurized waste feed is heated to a temperature at or above the critical temperature of water such that the waste feed is at supercritical conditions. In some embodiments, the pressurized waste feed is heated to a temperature between about 400° C. to 650° C. to become supercritical. In other embodiments, it may be below the critical temperature on exiting the recovery heat exchanger 402, with additional heating in another heater or in the reactor.

The supercritical waste feed stream may then be further heated by a feed heater 206. The feed heater 206 may not be present in some embodiments, or may be incorporated into the supercritical reactor 208. The feed heater 206 may be used to start the process, before reactor effluent is produced to be a heat source in the recovery heat exchanger system 204. Other methods of heating at the start of the process, e.g., by adding kerosene to the waste feed stream, may be used instead of or in addition to the feed heater 206. Once the process is initialized, the feed heater 206 may or may not be used.

The waste feed enters the supercritical reactor 208 as a supercritical fluid, though as indicated above, in other embodiments, it may be brought to supercritical temperature in the reactor, either using an incorporated heater or by heat from an exothermic reaction. Also entering the reactor 208 is a pressurized oxidant stream, which may or may not be heated. In many embodiments, air is the oxidant, although pure oxygen, oxygen-rich air, or other oxygen-containing gas mixtures besides air may be used. (Non-gaseous mixtures may be used in certain embodiments as described further below.) Air is 78 vol. % $N_2$, with large amounts of energy used to compress it. As discussed further below, this energy is recovered. In some embodiments, the oxidant may be added to the waste feed stream prior to entering the reactor or heat recovery system.

The reaction generates solids and a supercritical reactor effluent, which is flowed to the hot side of recovery heat exchanger system 204. Solid effluent may be transported with the liquid phase effluent or removed from the reactor discretely or continuously. The supercritical reactor effluent is cooled in the recovery heat exchanger system 204 and becomes a mixed phase reactor effluent including a gas phase effluent and a liquid phase effluent. The mixed phase reactor effluent is at low temperature and high pressure. The low temperature is well below the vaporization temperature of water, and in some embodiments is between 25° C. and 50° C. There may be minimal pressure drop across the recovery heat exchanger system 204.

The liquid phase effluent includes $H_2O$ and, in some embodiments, $CO_2$. In embodiments in which air is the oxidant, the gas phase effluent includes $N_2$ and may include a small amount of $O_2$. The mixed phase effluent is then introduced to a gas/liquid separator 214 to separate the two phases. The pressurized liquid phase effluent is then introduced to the pressure exchanger 202 to pressurize the incoming waste feed stream as described above. Once depressurized, the liquid phase effluent may be introduced to a separator 216. The separator 216 separates the now clean water and $CO_2$, if present.

The gas phase effluent, which is at high pressure and low temperature, is returned to the recovery heat exchanger system 204 to be heated and exits the system at high pressure and high temperature to drive an expander 212. The expander 212 in turn drives a compressor 210 that compresses the oxidant to be introduced to the supercritical reactor 208. The compressor 210, the supercritical reactor 208, and the expander 212 (which may be a turbine) form a Brayton cycle engine. In some embodiments, the compressed oxidant leaves the compressor 210 heated from the compression.

In the example supercritical water oxidation system of FIG. 1, the energy used to compress the oxidant is recovered in several ways. Moreover, energy generated by the reaction may also be captured for energy efficient, and some embodiments, energy neutral or energy positive oxidation.

First, heat and pressure are recovered from the supercritical reactor effluent in the recovery heat exchanger system 204 and pressure exchanger 202. Notably, the pressure recovery is performed after the heat recovery and after the supercritical reactor effluent is converted to a mixed phase reactor effluent. This allows the pressure to be recovered from a liquid phase reactor effluent. The reactor effluent is also used to drive the expander 212 after water is removed from the reactor effluent. This allows a gas phase reactor effluent to drive the expander (e.g., a turbine) without damage from salts that are present in water. In some embodiments, a system may incorporate one or more of these features with various modifications. For examples, in some embodiments, reactor effluent may be used to drive a turbine after any water removal process is performed.

Various modifications may be made to the system described with reference to FIG. 2. For example, any gas expander may be used in the systems described herein in place of a turbine as appropriate for a particular system, including pistons and scroll expanders. Further, while the example in FIG. 2 uses a Brayton cycle, the energy may be recovered using other thermodynamic cycles, such as an Ericsson cycle.

Figure 3:
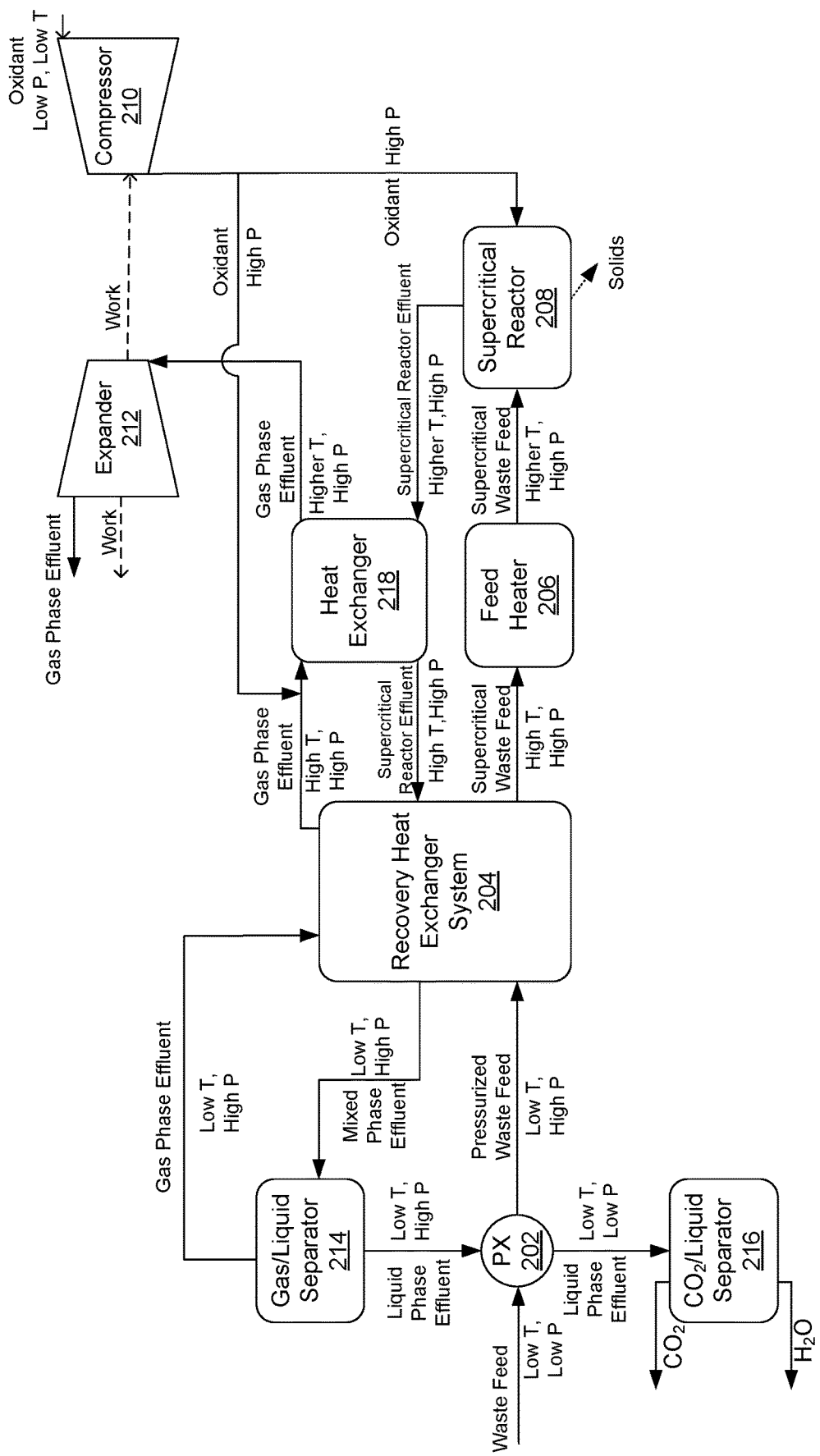

FIG. 3 shows another example of a system for supercritical water oxidation of waste according to various embodiments. The system in FIG. 3 is similar to that in FIG. 2, but includes a heat exchanger 218 configured to recover some heat from the supercritical reactor effluent before it enters the recovery heat exchanger system 204. Such a system may be particularly useful with waste feed streams that have high organic content that will generate a large amount energy in the supercritical reactor 208. The recovered heat may be used to drive the expander 212, producing extra work, which in turn may be converted to electricity. Example temperatures of the cold side of the heat exchanger 218 may be around 400° C.-450° C. with example temperatures of the hot side of the heat exchanger 218 around 600° C.-650° C. After exiting the recovery heat exchanger system 204, the gas phase effluent is further heated in the heat exchanger 218. In some embodiments, oxidant from the compressor 210 is injected into the gas phase effluent stream entering the heat exchanger 218 to increase mass flow.

As indicated above, the recovery heat exchanger system may include one or more heat exchangers according to various embodiments. In the examples of FIGS. 2 and 3, the recovery heat exchanger system is shown to exchange heat between 3 streams: a waste feed stream, a reactor effluent stream, and a gas phase reactor effluent stream after water is removed. The heat exchanger recovery systems may use a triple heat exchanger or multiple heat exchangers to exchange heat between the three streams.

Figure 4:
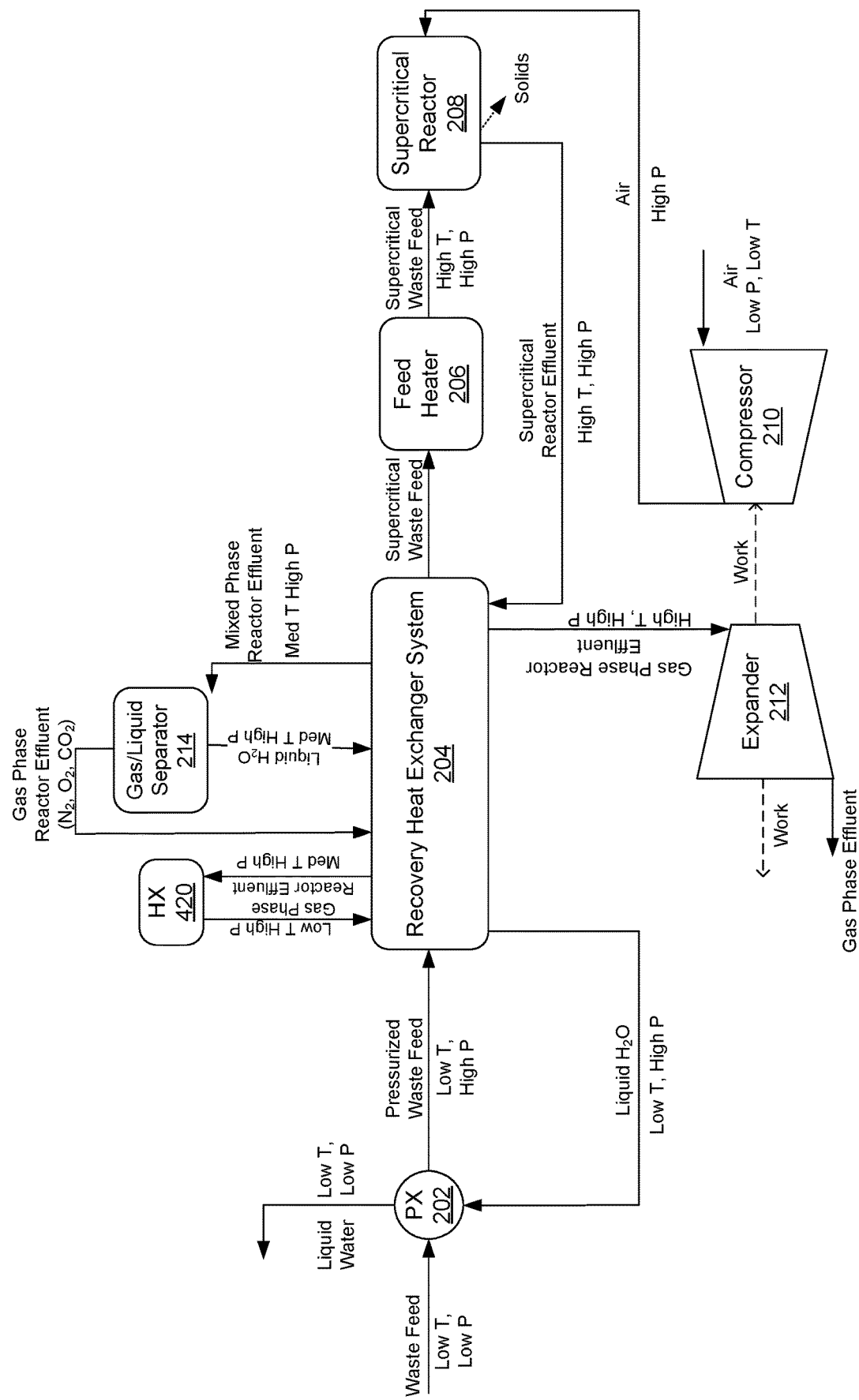

FIG. 4 shows an example of another system for supercritical water oxidation of waste. In the example of FIG. 4, carbon dioxide ($CO_2$) produced in the supercritical reactor 208 is used to drive the expander 212. This may be done by cooling the supercritical reactor effluent to a temperature at which water condenses but the $CO_2$ remains in the gas phase. For example, the supercritical reactor effluent may enter the recovery heat exchanger system at a temperature of 450° C. and be cooled to 200° C.-250° C. (an example of "Med T" as shown in FIG. 4) to form a mixed phase reactor effluent. The mixed phase reactor effluent is then separated in the gas/liquid separator 214 into a gas phase effluent and a liquid phase effluent. The gas phase effluent includes $CO_2$. In the example shown in FIG. 4, with air as the oxidant, the gas phase effluent includes $N_2$, $O_2$, and $CO_2$. The liquid phase effluent is $H_2O$, which is further cooled to low T, e.g., 25° C., and flowed to the pressure exchanger 202, which depressurizes the liquid water and pressurizes the waste feed stream.

In some embodiments, the gas phase heat exchanger is further cooled in a heat exchanger 420 before being heated again for introduction to the expander 212. The heat exchanger 420 may be considered a component of the recovery heat exchanger system 204, but it is shown as a separate component for discussion purposes. By performing gas/liquid separation before the heat is fully recovered from the supercritical reactor effluent, the large amount of $CO_2$ produced in the reaction can be used to drive the expander 212 and generate power, e.g., in the Brayton cycle engine defined by the expander 212, compressor 210, and supercritical reactor 208. In some embodiments, an additional heat exchanger may be used to cool the supercritical reactor effluent before it reaches the recovery heat exchanger system 204, for example, as shown in FIG. 3.

Figure 5:
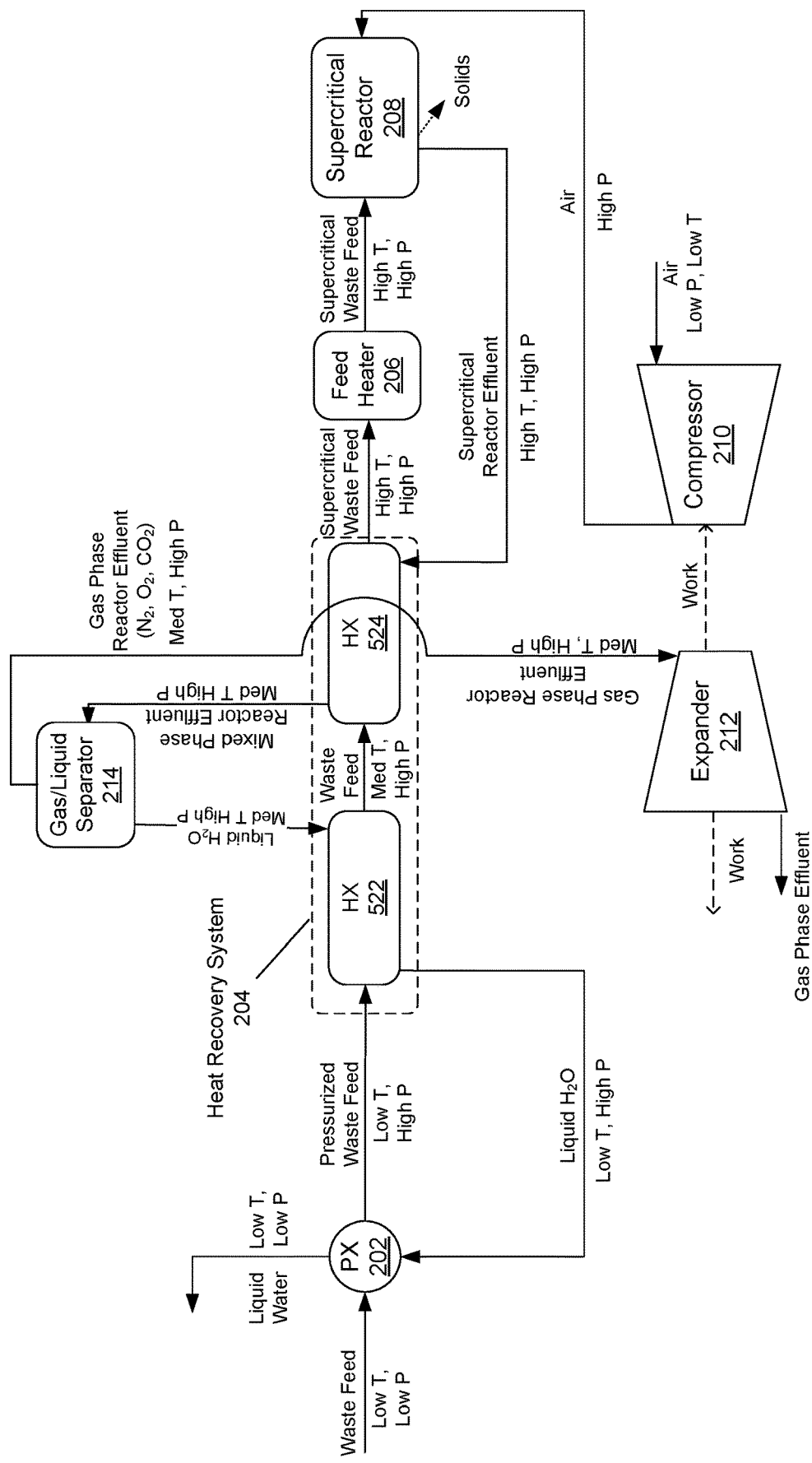
Figure 6:
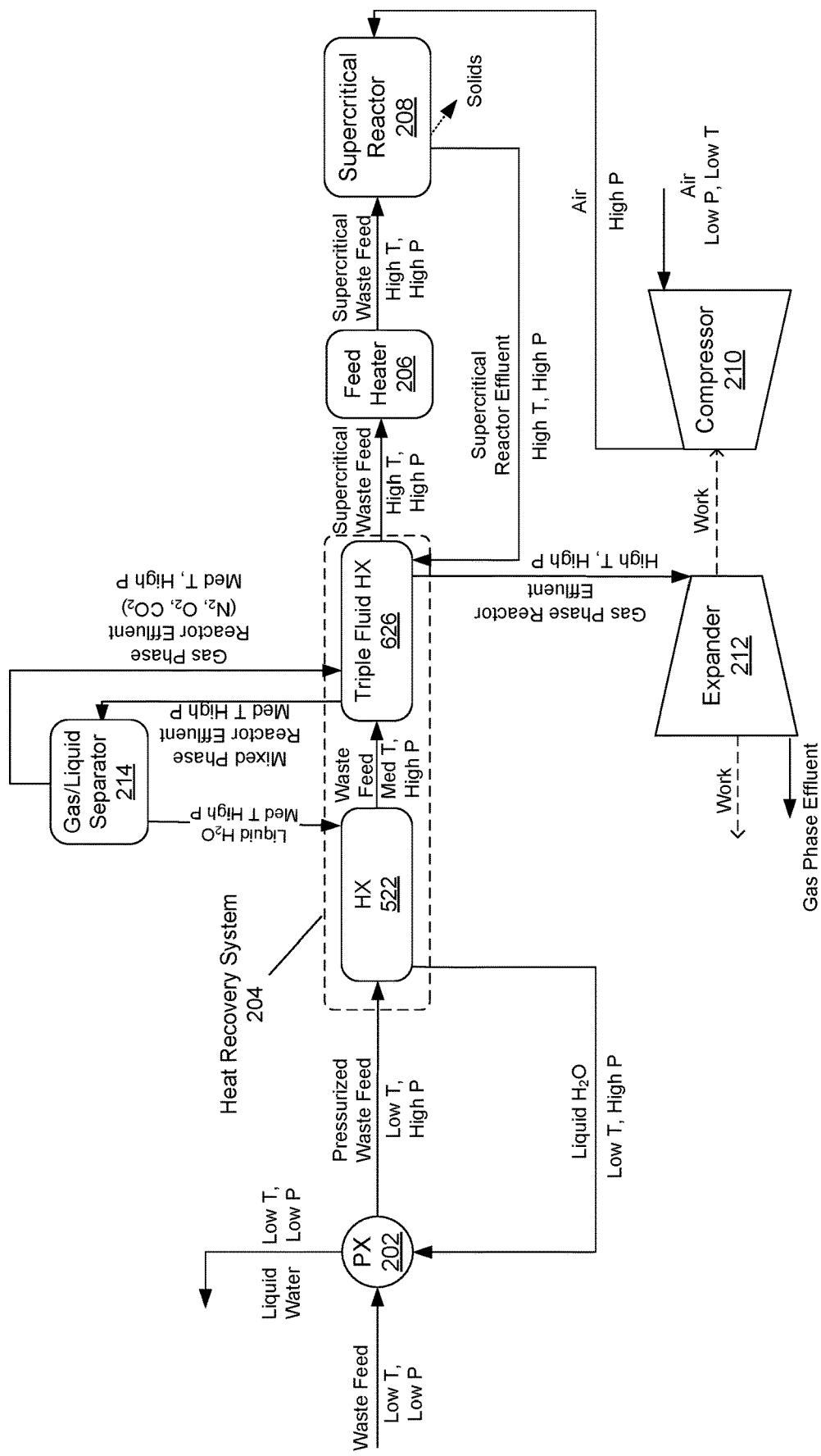

As indicated above, the recovery heat exchanger system may include one or more heat exchangers. FIGS. 5 and 6 show examples of alternate configurations for systems in which the gas phase reactor effluent includes $CO_2$. In the example of FIG. 5, the gas phase reactor effluent including $CO_2$ is introduced to the expander 212 at the temperature of gas/liquid separation, e.g., 200° C.-250° C. The heat recovery system 204 includes two heat exchangers (HX), heat exchanger 522 and heat exchanger 524, which together heat the pressurized waste feed to a temperature above the critical point of water to produce the supercritical waste feed. Heat exchanger 524 cools the supercritical reactor effluent to form the mixed phase reactor effluent that is flowed to the gas/liquid separator 214 and heat exchanger 522 cools the liquid reactor effluent (i.e., $H_2O$) to low temperature.

In the example of FIG. 6, the heat recovery system 204 includes heat exchanger 522 as described above, and a triple heat exchanger 626 that exchanges heat between three streams: heating the waste feed stream that exits the heat exchanger 522 to supercritical conditions, heating the gas phase effluent after gas/liquid separation to drive the expander 212, and cooling the supercritical reactor effluent to form the mixed phase reactor effluent prior to gas/liquid separation.

Referring back to FIG. 2, the gas phase effluent is returned to the recovery heat exchanger system 204 to be heated and exits the system at high pressure and high temperature to drive an expander 212. In some embodiments, the expansion is performed at low (e.g., near ambient) temperatures without re-heat. This is illustrated in FIG. 7, which shows another example of a system for supercritical water oxidation of waste according to various embodiments.

Figure 7:
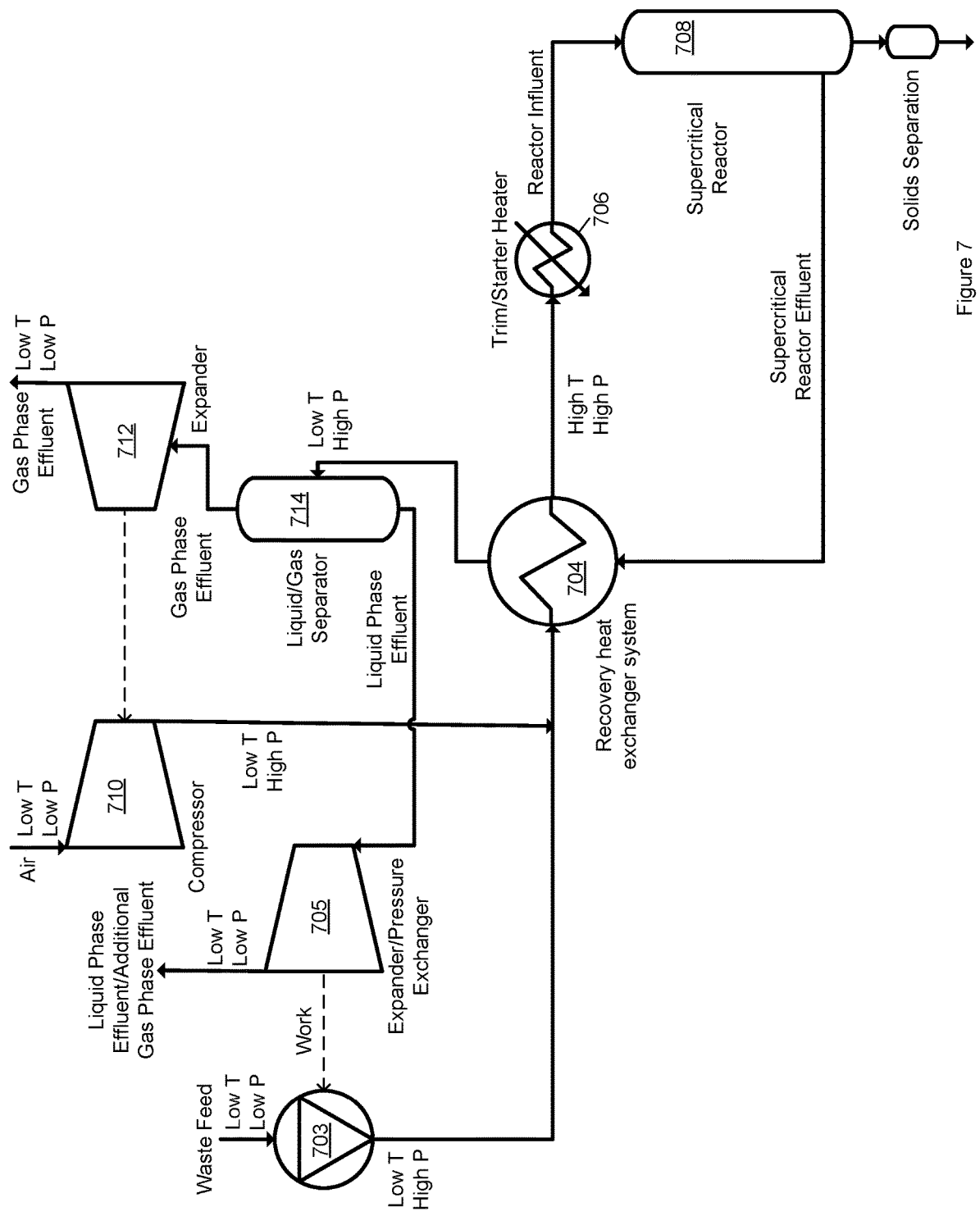

In the example of FIG. 7, the supercritical reactor effluent enters a recovery heat exchanger system 704. Here, the recovery heat exchanger system may be a single two-fluid heat exchanger that cools the supercritical reactor effluent to low T and heats the pressurized waste feed stream. The supercritical reactor effluent becomes a mixed phase reactor effluent including a gas phase effluent and a liquid phase effluent as described above. The mixed phase reactor effluent is at low temperature and high pressure. The low temperature is well below the vaporization temperature of water, and in some embodiments is between 25° C. and 50° C. There may be minimal pressure drop across the recovery heat exchanger system 704. The liquid phase effluent includes $H_2O$ and, in some embodiments, $CO_2$. In embodiments in which air is the oxidant, the gas phase effluent includes $N_2$ and may include a small amount of $O_2$. The mixed phase effluent is then introduced to a gas/liquid separator 714 to separate the two phases.

In the example of FIG. 7, the gas phase effluent is then introduced to an expander 712 at low temperature (e.g. 40° C.). The expander will cool the gas phase effluent further—and may cool it significantly given the large pressure drop.

The expander 712 in turn drives a compressor 710 that compresses the oxidant to be introduced to the supercritical reactor 708. In this example, the oxidant is at low temperature and may be introduced to the waste feed prior to its introduction to the recovery heat exchanger system 704, so that it can be heated. The liquid phase effluent is introduced to an expander 705, which can be used to drive a pump 703 to pressurize the waste feed. As described above, the pressurized waste feed is mixed with compressed oxidant at low temperature and then introduced to the recovery heat exchanger system 704 for heating. A feed heater 706 may then be used to further heat the pressurized waste stream and oxidant and form the reactor influent.

In some embodiments, work generated from expansion of the reactant effluent is performed at low (e.g., near ambient) temperature without reheating the gas phase effluent as described below with respect to FIG. 8. Heat may be provided in other ways; for example, in some embodiments, heat is transferred from the compressor to the expander. In other embodiments, the stream entering the expander can be at a medium temperature—above ambient, but below reaction. Heat can be scavenged from other subsystems or processes with an example described further below with respect to FIG. 11.

Figure 8:
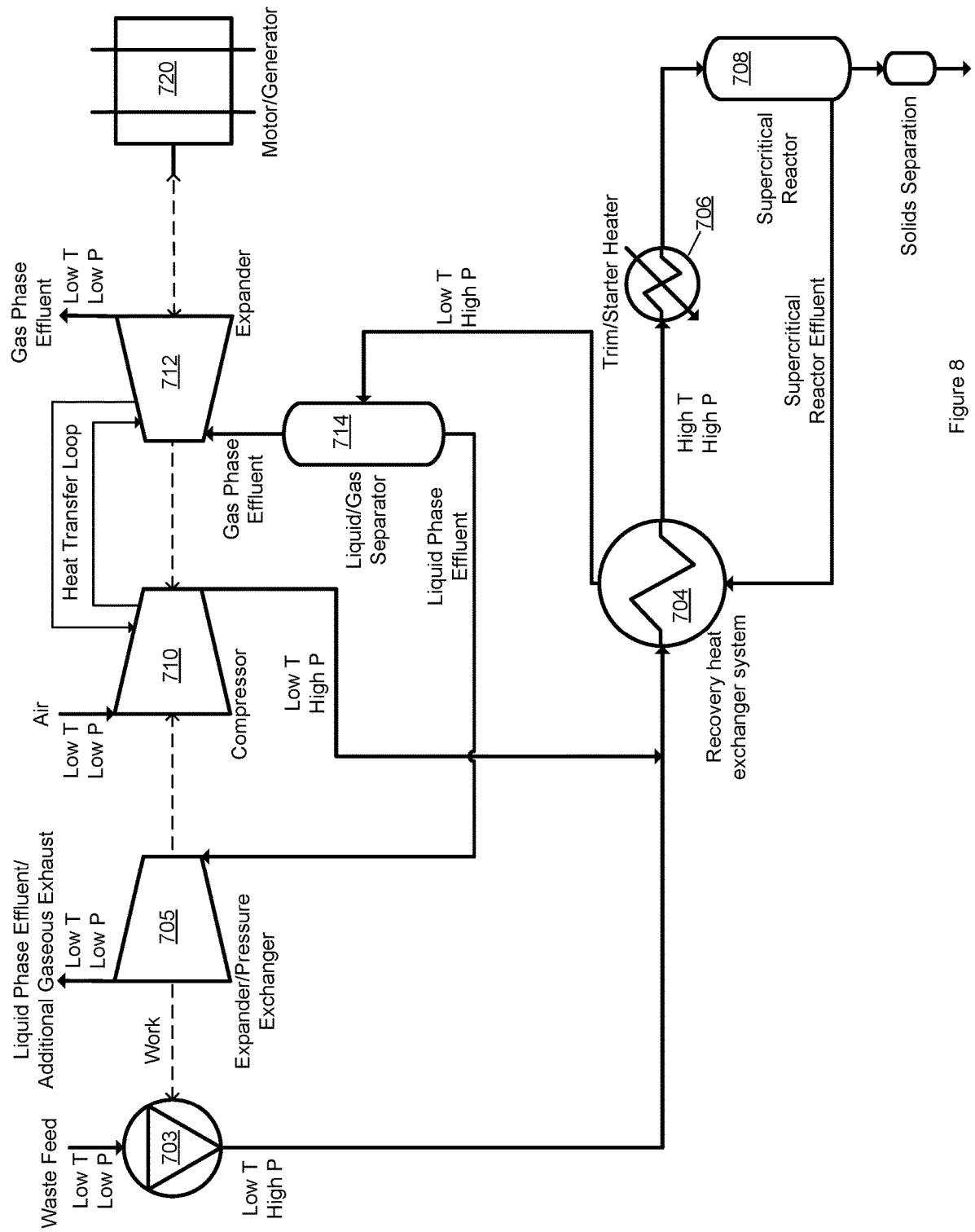

FIG. 8 shows another example of a system for supercritical water oxidation of waste according to various embodiments. The system in FIG. 3 is similar to that in FIG. 7, but includes a motor/generator 720. The pump 703, expander/pressure exchanger 705, compressor 710, expander 712, and motor/generator 720 are shown as a single shaft system. As such the system includes a series of compressors and expanders that work off one work transferring shaft that is attached to the motor/generator 720 that starts the process and can take energy off the process. It will be understood that other configurations may be used, including multiple shaft systems, as appropriate.

The system in FIG. 8 includes a heat transfer loop between the compressor 710 and the expander 712. The heat transfer loop can be constructed in sever ways. For example, a pump and piping system can be used to circulate a heat transfer fluid, such as a water-glycol mixture from the compress block to the expander block. The compressor and expander blocks can be designed to allow the heater transfer fluid to be circulated near the respective processing. Compressing the oxidant heats the gas; expanding the gas phase effluent cools it. In the example of FIG. 8, the compressor 710 is a heat source and the expander 712 is a heat sink. A heat transfer fluid may be circulated between the compressor block and the expander block to keep the gas close to one temperature. Thus, while the pressure is transferred to generate power, the oxidant and gas phase effluent remain at low temperature. This can be advantageous for a few reasons. First, isothermal expansion and compression is the most efficient. Second, it can allow lubricants to be used for the compressor 710; the very high temperatures that otherwise result from the compression may be above the thermal decomposition temperature of the lubricant. The use of the heat transfer loop between the compressor 710 and expander 712 also renders other heat recovery components unnecessary.

Figure 9:
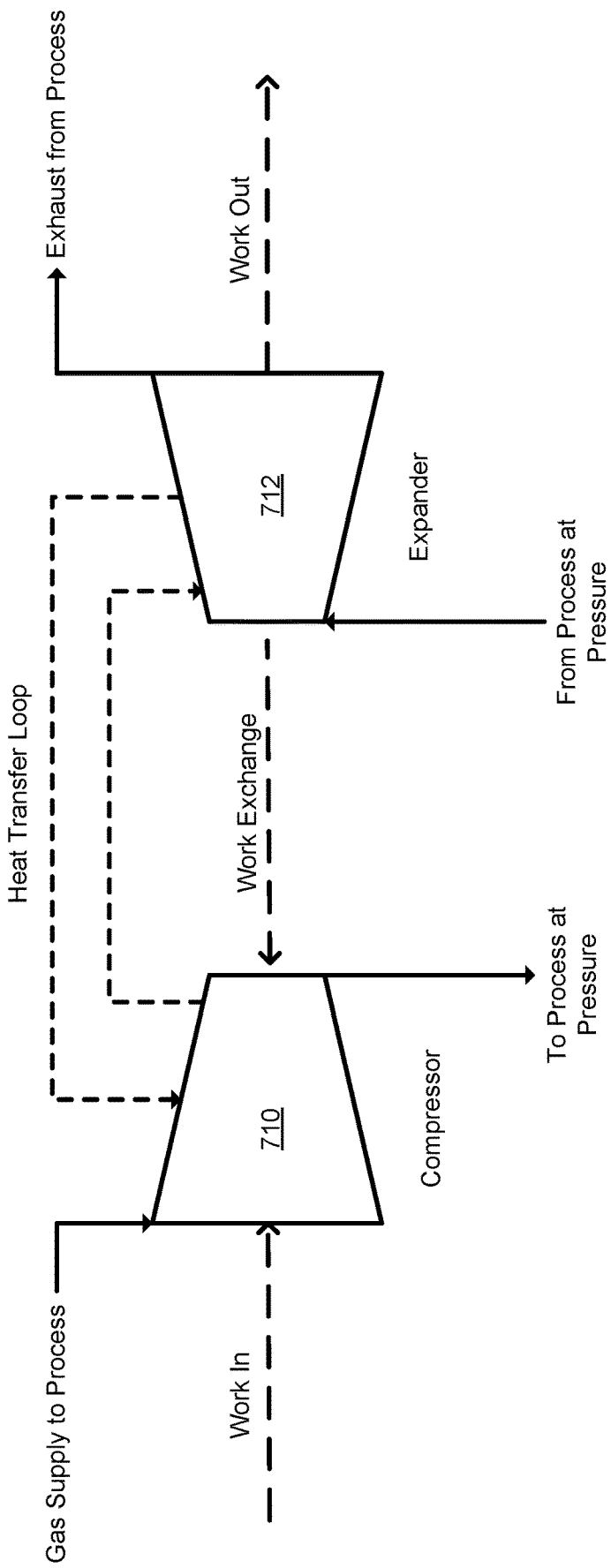

In the example of FIG. 8, the compressor 710 and the expander 712 may be parts of an Ericsson cycle used for pressure recovery. Referring to FIG. 9, a compressor 710, expander 712, and heat transfer loop are shown. Heat may be transferred as the oxidant (gas supply to process) is being compressed. The heat is transferred at one temperature, e.g., 25° C. or 40° C., to the expander 712. As the gas effluent (from process at pressure) expands, it accepts the transferred heat such that the expansion is isothermal. The compression and expansion are isothermal. The heat of compression acts as a heat source while expansion cooling acts as a cold sink. Heat is transferred at the temperature would otherwise change.

The heat can be transferred through any mode. For example, if a reciprocating piston compressor and expander are used, a heat transfer fluid can be circulated from the compressor block to the expander block with enough fluid to stay at a single temperature. The heat can also be transferred directly through a piston. In some embodiments, a piston that accommodates heat transfer rod fins affixed to the chamber block may be used. An example of such a piston is described below with respect to FIG. 14. This arrangement increases the heat transfer surface within the chamber and allows for sufficient heat transfer during the expansion or compression process to approach Ericsson cycle efficiency.

FIG. 14, described further below, provides an example of a compressor or expander that enables the heat transfer. In an Ericsson cycle, heat addition and rejection are isobaric and compression and expansion are isothermal. Isothermal processes are efficient for pressure exchange of compressible fluids. It will be appreciated however, that there may be some temperature difference ($\Delta T$) across the heat transfer loop. In some embodiments, a threshold $\Delta T$ is that which is low enough to make the process energy neutral. This can depend on the amount of organic matter in the feed stream, which provides the fuel for the process. That is, the $\Delta T$ may be no more than 50° C., 40° C., 30° C., 20° C., 10° C., 5°, or 1° C. As used in this context, the term "isothermal" refers to having a $\Delta T$ of 10° C. or less, with the term "near isothermal" referring to having a $\Delta T$ of greater than 10° C. and no more than 50° C.

Transferring heat as it is generated during compression (or used during expansion) can eliminate or reduce the need for stages in the compressor and expander. Large overall pressure ratios (e.g., 3500 psi to ambient) can be achieved with fewer stages, or in some embodiments, a single stage. In addition to the reduction in stages, the compressible fluid pressure recovery can eliminate the size or need for complex recovery heat exchangers as some heat is added or removed in the process. The ratio of compressor-expander heat transfer and compressor heat addition and expander heat removal depends on the particular system.

Figure 10:
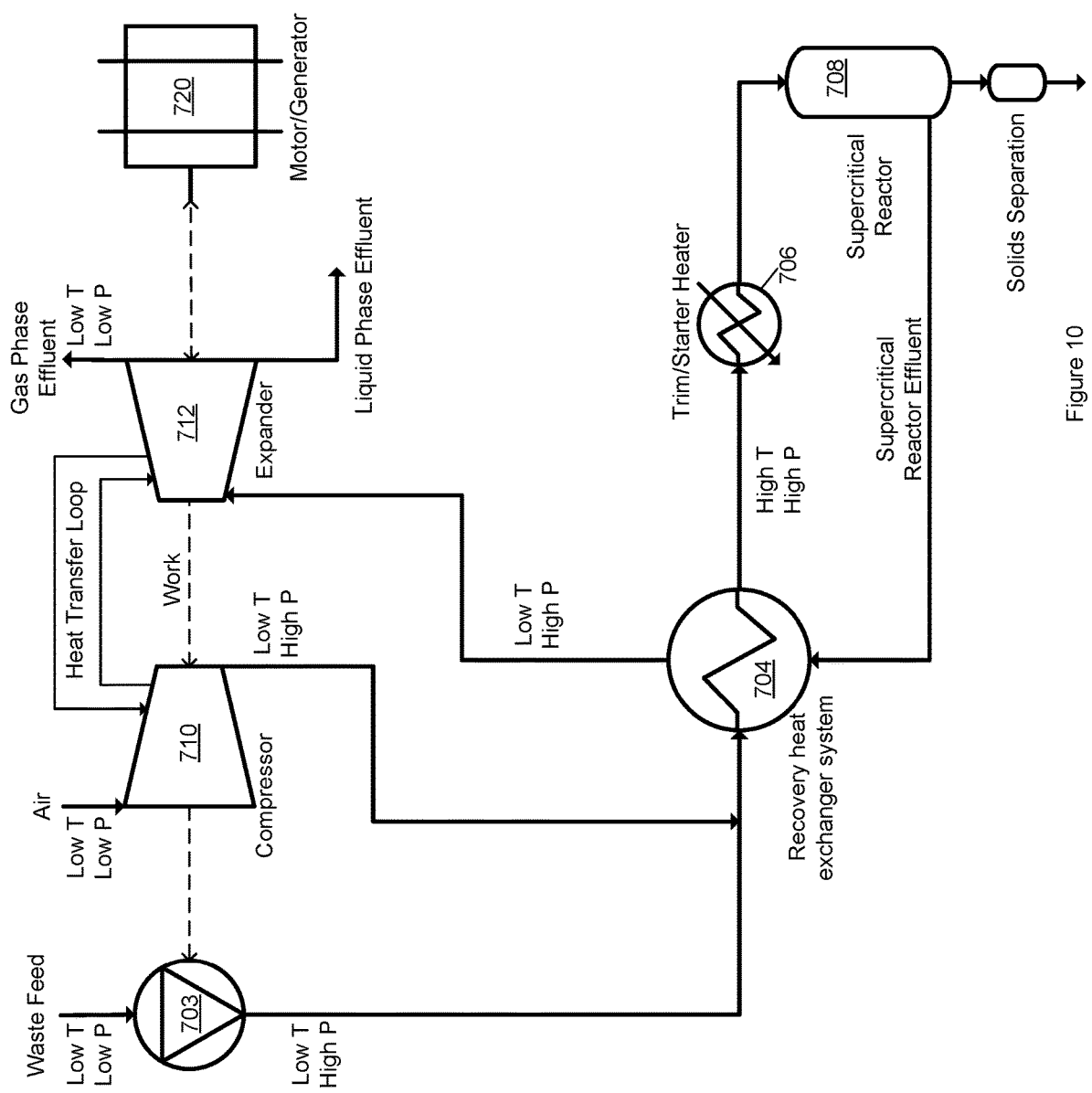

FIG. 10 shows another example of a system for supercritical water oxidation of waste according to various embodiments. The system of FIG. 10 is similar to that of FIG. 8, but with the expander 712 handling all fluids (mixed phase effluent). As in the system of FIG. 8, the compressor and expander may be isothermal with heat removed or provided during the compression or expansion. The mixed phase effluent is separated to form the liquid phase effluent and the gas phase effluent in the expander 712. This allows a reduction in the number of parts, and also allows the treated water to act as a thermal source for expansion. That is, the water present in the mixed phase effluent provides heat to help prevent cooling during expansion.

Figure 11:
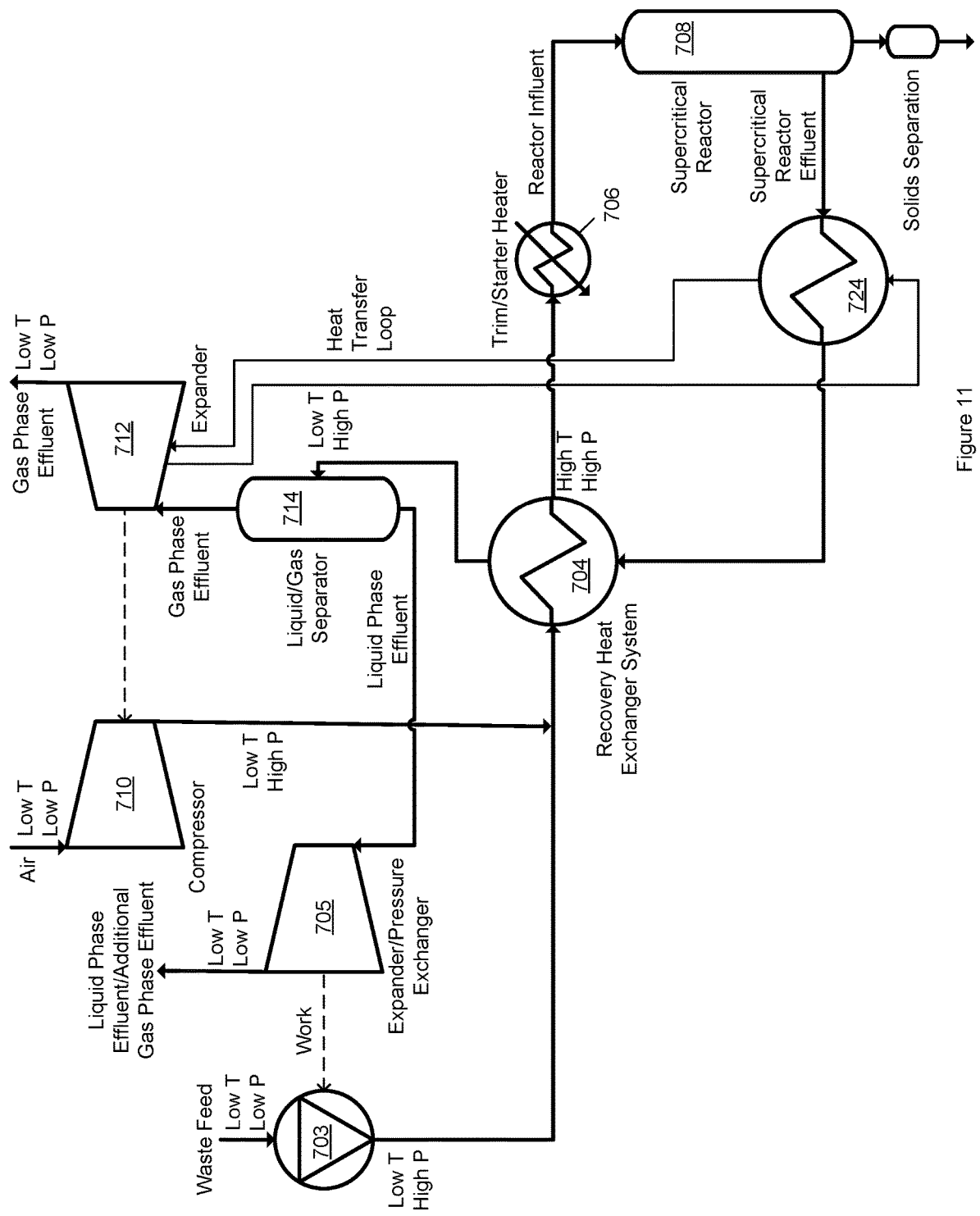

FIG. 11 shows another example of a system for supercritical water oxidation of waste according to various embodiments. The system of FIG. 10 is similar to that of FIG. 8, but with a heat exchanger 724 used to scavenge some heat generated in the supercritical reactor 708 to be supplied to the expander 712. The heat exchanger may be part of the recovery heat exchanger system 704. Heat may be scavenged from other parts of the system to be supplied to the expander 712 by appropriately placing the heat exchanger 724.

In some embodiments, a liquid oxidant may be used with examples including hydrogen peroxide. The resulting carbon dioxide and excess gaseous oxygen may be expanded for pressure recovery according to various embodiments as described above. For example, a hydrogen peroxide mixture would be used to supply the required oxygen. The supercritical oxidation reaction will convert the mixture to water and carbon dioxide. The carbon dioxide can be separated and then expanded for pressure recovery.

As noted in the examples above, air may be used as an oxidant stream in many embodiments. If nitrous oxide or similar species are produced, they may be recaptured for energy recovery or re-use as an oxidant. The examples above chiefly describe oxidation of organic waste, which produces $CO_2$. However, it will be understood that the systems may be similarly implemented with other feeds and reaction products. Further, the energy recovery systems may be implemented with non-supercritical exothermic reactions, including reactions at sub-supercritical pressures or at sub-supercritical temperatures. That is, pressure recovery and/or heat recovery may be implemented for exothermic reactions that are at pressurized and/or heated, but not necessarily supercritical, conditions. In such systems, any appropriate reactor may be used. In particular embodiments, oxidation of waste may be performed at supercritical temperatures but sub-supercritical pressures. In such embodiments, any of the systems and methods described above with respect to FIGS. 2-11 may be modified accordingly.

Heat Exchanger

According to various embodiments in the systems and methods described herein, the recovery heat exchanger system and components thereof are thermally balanced such that the pinch, the temperature differential of streams at a hot or cold side of the heat exchanger or system are relatively small. For example, according to various embodiments, there is a maximum pinch of 15° C., 10° C., or 5° C. In some embodiments, greater pinch values may be tolerated. In some embodiments, thermally balancing the system involves heating the gas phase effluent after separation as described above with reference to FIGS. 2-4 and 6.

Figure 12:
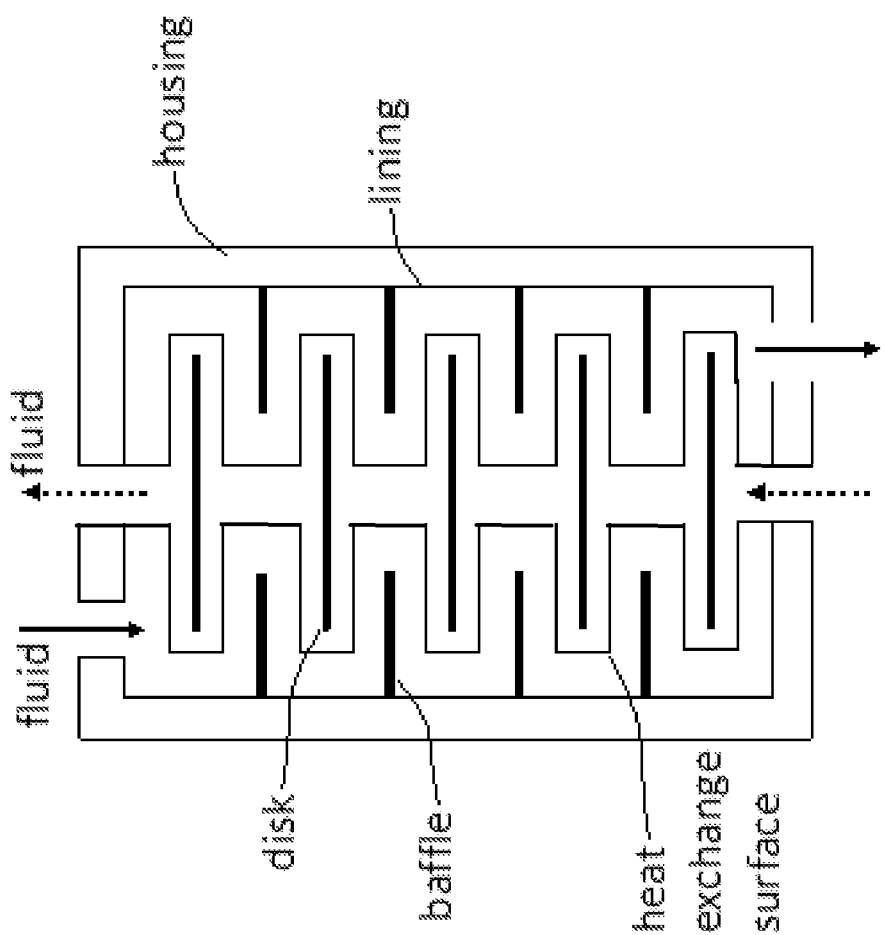
FIG. 12 shows a schematic example of a heat exchanger that may be employed in implementations of the systems described herein.

In some embodiments, the heat exchanger is configured to prevent or reduce fouling on the heat transfer surfaces. FIG. 12 shows an example of a heat exchanger that may be employed for high heat transfer rate and low fouling. The heat exchanger in FIG. 12 has a series of disks and baffles and is configured to exchange heat between two fluids, one of which flows through an outer chamber and the other flows through an inner chamber. In the example of FIG. 12, the outer chamber is defined by an interior wall (labeled lining) and heat exchange surfaces. A series of baffles, each of which extends from the interior wall, is arrayed along the length of the heat exchanger. An outer fluid is conveyed along the series of baffles and heat exchange surfaces from one end of the heat exchanger to the other. The baffles may be any appropriate shape including an annulus. The inner chamber is defined by the heat exchanger surfaces. A series of disks, each of which is centered along a central axis, is arrayed along the length of the heat exchanger. An inner fluid is conveyed along the series of disks and heat exchange surfaces from one end of the heat exchanger to the other. The disks may be any appropriate shape including circular. The baffles and disks are shown as being in planes perpendicular to the overall fluid flow direction, but also be at various angles. As can be seen in FIG. 12, the outer dimensions of the baffles are equal to the dimensions of the interior wall, and the outer dimensions of the disks are less than those of the interior wall. The baffles and/or disks may be configured to move by rotation, vibration, or translation to reducing fouling.

In some embodiments, a reactant or neutralizing substance may be introduced to the heat exchanger to reducing fouling. This may be done at the ends of the heat exchanger, or at points along the heat exchanger including through the disks, baffles, or interior wall. In some embodiments, a heat balance fluid may be introduced in a similar fashion. In some embodiments, one or more of the disks, baffles, and interior wall may include or be a catalyst for reaction to prevent or reduce accumulation of material.

Additional materials or structures may be disposed within the heat exchanger for catalysis, enhanced mixing, and cleaning. In some embodiments, the materials may be sacrificial and may be replaced after consumption. Cleaning and scraping components may be included in the heat exchanger. The interior wall, baffles, and disks may be configured for heating or electrification. For example, one or more components may be an electrode.

In some embodiments, such as those described with respect to FIGS. 2-11 the recovery heat exchanger system is pressurized, with all streams at high pressure. In such embodiments, the housing of the heat exchanger is a material that is configured for supporting the high pressure envelope, such as steel. Because all of the fluid streams are at the same pressure, the interior surfaces, including the interior wall, disks, baffles, and heat transfer surfaces do not need to be high pressure materials. In some embodiments, the interior wall is a removable lining that can be removed and cleaned or replaced. Examples of lining materials include titanium, which may be welded or otherwise attached to the housing. In some embodiments, all internal components may include sheets of titanium shaped into disks and baffles or coating disk and baffle structures.

Reactor

Figure 13:
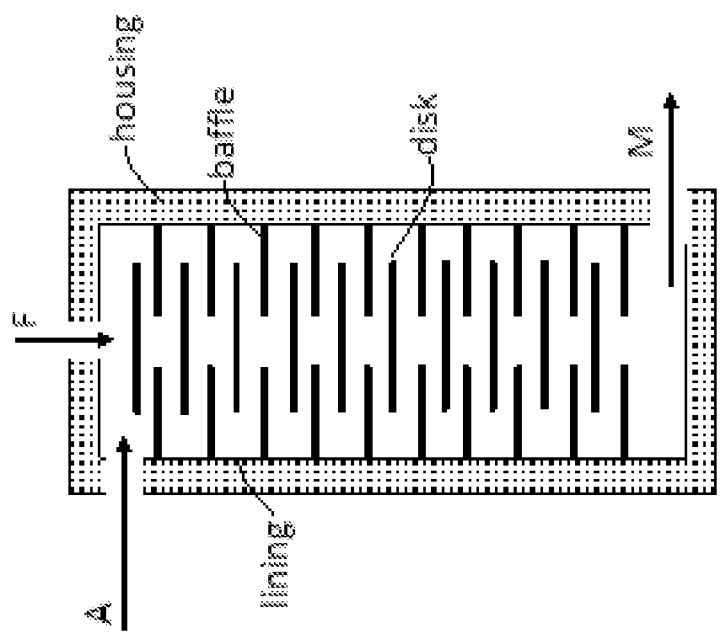
FIG. 13 shows a schematic example of a supercritical reactor that may be employed in implementations of the systems described herein.

The supercritical reactor used in implementations described herein may be any reactor that can be used in high pressure, high temperature, and high fouling or corrosion environments, including vessel reactors and pipe reactors. A schematic example of a reactor that may be used in implementations described herein is provided in FIG. 13. The reactor includes inlets for feed (F) and air (A) or other oxidant streams and an outlet for a product (M) stream.

A series of baffles, each of which extends from an interior wall, is arrayed along the length of the reactor. The baffles may be any appropriate shape including an annulus. A series of disks, each of which is centered along a central axis, is arrayed along the length of the reactor interspersed between the baffles. The disks may be any appropriate shape including circular.

The baffles and disks are shown as being in planes perpendicular to the overall fluid flow direction, but also be at various angles. The baffles and/or disks may be configured to move by rotation, vibration, or translation to reducing fouling. The outer dimensions of the baffles are equal to the dimensions of the interior wall, and the outer dimensions of the disks are less than those of the interior wall. In operation, the reactants are conveyed alternately inward radially along a baffle and outward along and between disks.

The presence of disks and baffles increases the path length of reaction without increasing reaction volume. The effects are more complete reactions, better mixed reactions, and shorter residence times. In addition, less reactor material is used than for other types of reactors while offering the same path length. This may be especially important when using corrosion-resistant materials and for reactions that take place at high pressure.

In some embodiments, a reactant or neutralizing substance may be introduced to the reactor at points along the reactor including through the disks, baffles, or interior wall. In some embodiments, one or more of the disks, baffles, and interior wall may include or be a catalyst for reaction. Additional materials or structures may be disposed within the reactor for catalysis, enhance mixing, and cleaning. In some embodiments, the materials may be sacrificial and may be replaced after consumption. Cleaning and scraping components may be included in the reactor. The interior wall, baffles, and disks may be configured for heating or electrification. For example, one or more components may be an electrode.

For supercritical reactions, the housing is a material that is configured for supporting a high pressure envelope. Examples of materials include steel. Because all of the fluid streams are at the same pressure, the interior surfaces, including the interior wall, disks, baffles, and heat transfer surfaces do not need to be high pressure materials. In some embodiments, the interior wall is a removable lining that can be removed and cleaned or replaced. Examples of lining materials include titanium, which may be welded or otherwise attached to the housing. In some embodiments, all internal components may include sheets of titanium shaped into disks and baffles or coating disk and baffle structures.

Pressure Exchanger

Pressure from the liquid effluent can be recovered in several ways using pressure exchangers. Pressure exchangers may be centrifugal devices like turbines or positive displacement devices that operate in isobaric or pressure drop configurations. The water pressure may be converted to shaft work and transmitted to a pump or generator or directly applied to an incoming feed through a piston or direct interface. Direct interface and piston configurations are very efficient, with efficiencies often over 98%; however, if the incoming waste cannot come in contact with liquid effluent, then these configurations should be avoided.

Compressor/Expander with Heat Transfer

In some implementations, the system may be implemented using a compressor and/or expander that is configured for heat transfer during compression or expansion. A schematic example of a reactor that may be used in implementations described herein is provided in FIG. 14. In FIG. 14, a compressor 1410 is depicted, though it will be understood that the apparatus may also be implemented as a gas expander. The compressor 1410 includes a piston 1452 having heat transfer rod fins 1454. A dynamic seal 1456 seals the compression area between the piston 1452 and gas inlet/outlets. During compression, the piston 1452 moves in the direction indicated such that the heat transfer rod fins 1454 mate with reciprocal heat transfer rod fins 1464. Heat is transferred in the direction indicated, with a heat transfer fluid circulating. If implemented as a gas expander, the direction of heat transfer and the direction of gas inlet/outlet are reversed.

Feed Examples

The processes, systems, and apparatuses may be used to remove various substances from water. Examples of relatively complex waste feeds include but are not limited to antifreeze, coal, diesel fuel, *E. coli*, human waste, gray water, hydraulic fluid, industrial bio-sludge, kerosene, motor oil, paint, paper, paraffin oil, pharmaceutical waste, propellants, manure, paper mill sludge, contaminated soil, waste oils, and wood fibers. Examples of inorganic substances that may be removed from a feed include but are not limited to aluminum hydroxide, aluminum, ammonia, ammonium salts, boric acid, bromides, calcium salts, fluorides, hydrochloric acid, hydrofluoric acid, iron chloride, iron oxide, lead chloride, lead sulfate, lithium hydroxide, lithium sulfate, magnesium salts, potassium salts, silica, sodium salts, sulfur, sulfuric acid, titanium dioxide, zinc chloride, and zinc sulfate. Examples of organic substances that may be removed from a feed include but are not limited to acetic acid, benzene, cellulose, chloroform, cyanide, cyclohexane, DDT, dextrose, dichloroethylene, dinitrotoluene, ethanol, ethyl acetate, isooctane, mercaptans, nitrobenzene, octachlorostyrene, phenol, polychlorinated biphenyls, sucrose, surfactants, trifluoroacetic acid, and urea.

One having ordinary skill in the art will understand that the various components and subsystems of the examples provided in FIGS. 2-14 may be combined or used with other systems. While the present invention has been particularly described with respect to the illustrated embodiments, it will be appreciated that various alterations, modifications and adaptations may be made based on the present disclosure, and are intended to be within the scope of the present invention. While the invention has been described in connection with the disclosed embodiments, it is to be understood that the present invention is not limited to the disclosed embodiments but, on the contrary, is intended to cover various modifications and equivalent arrangements included within the scope of the claims.

What is claimed is:

1. A method comprising:
   compressing an oxidant stream to form a compressed oxidant stream, wherein compressing the oxidant stream is performed with an oxidant stream temperature increase of no more than 100° C.;
   generating, in a supercritical reactor, waste solids and a reactor effluent from an aqueous supercritical waste feed stream and the compressed oxidant stream; and
   expanding at least a portion of the reactor effluent to generate work.

2. The method of claim 1, further comprising separating components of the reactor effluent to form a pressurized gas phase reactor effluent stream, wherein the pressurized gas phase reactor effluent stream is expanded to generate the work.

3. The method of claim 2, further comprising exchanging heat between a compressor compressing the oxidant stream and a gas expander expanding the at least a portion of the reactor effluent.

4. The method of claim 1, wherein compressing the oxidant stream and expanding the at least a portion of the reactor effluent are isothermal processes.

5. The method of claim 1, wherein compressing the oxidant stream is performed with an oxidant temperature increase of no more than 50° C.

6. The method of claim 2, further comprising exchanging heat between the reactor effluent and the pressurized gas phase reactor effluent stream to heat the pressurized gas phase reactor effluent stream.

7. The method of claim 2, further comprising exchanging heat between a pressurized waste feed stream, the reactor effluent, and the pressurized gas phase reactor effluent stream to thereby heat the pressurized waste feed stream to supercritical conditions to form the aqueous supercritical waste feed stream and cool the reactor effluent to form a pressurized mixed phase reactor effluent.

8. The method of claim 1, wherein the oxidant stream comprises $N_2$ and the at a least portion of the reactor effluent comprises the $N_2$ and further comprising separating components of the reactor effluent to form a pressurized gas phase reactor effluent stream comprising the $N_2$.

9. The method of claim 1, further comprising removing water from the reactor effluent prior to expanding the at least a portion of the reactor effluent.

10. The method of claim 1, wherein the at least a portion of the reactor effluent is expanded in an expander and the expander is driven by a mixed phase reactor effluent and further comprising separating the mixed phase reactor effluent into a gas phase effluent and a liquid phase effluent.

11. A method comprising:
    compressing an oxidant stream to form a compressed oxidant stream;
    generating, in a supercritical reactor, waste solids and a reactor effluent from an aqueous supercritical waste feed stream and the compressed oxidant stream; and
    expanding at least a portion of the reactor effluent to generate work, wherein the at least a portion of the reactor effluent is non-aqueous.

12. The method of claim 11, wherein compressing the oxidant stream is performed with an oxidant stream temperature increase of no more than 100° C.

13. The method of claim 11, further comprising exchanging heat between a compressor compressing the oxidant stream and a gas expander expanding the at least a portion of the reactor effluent.

14. The method of claim 11, further comprising separating components of the reactor effluent to form a pressurized gas phase reactor effluent stream.

15. The method of claim 14, further comprising exchanging heat between the reactor effluent and the pressurized gas phase reactor effluent stream to heat the pressurized gas phase reactor effluent stream.

16. A method comprising:
    generating waste solids and a supercritical reactor effluent from a supercritical waste feed stream;
    cooling the supercritical reactor effluent to form a pressurized mixed phase reactor effluent, the pressurized mixed phase reactor effluent comprising a pressurized liquid phase reactor effluent and a pressurized gas phase reactor effluent;
    separating components of the pressurized mixed phase reactor effluent to form a pressurized liquid phase reactor effluent stream and a pressurized gas phase reactor effluent stream;
    exchanging pressure between the pressurized liquid phase reactor effluent and an aqueous waste feed stream to pressurize the aqueous waste feed stream;
    expanding the pressurized gas phase reactor effluent stream to generate work, wherein the pressurized gas phase reactor effluent stream is non-aqueous.

17. The method of claim 16, further comprising compressing an air stream and wherein the pressurized gas phase reactor effluent includes $N_2$ from the air stream.

18. The method of claim 16, further comprising heating the pressurized gas phase reactor effluent.

19. The method of claim 18, wherein heating the pressurized gas phase reactor effluent comprises exchanging heat between the pressurized gas phase reactor effluent and the supercritical reactor effluent.

20. The method of claim 16, wherein exchanging the pressure comprises driving a pump with an expander.

21. A method comprising:
    compressing an air stream to form a compressed air stream;

inletting the compressed air stream and a supercritical aqueous waste feed stream to a supercritical reactor;

generating waste solids and a supercritical reactor effluent in the supercritical reactor;

exchanging heat between the supercritical reactor effluent and a pressurized aqueous waste feed stream to cool the supercritical reactor effluent to thereby form a pressurized mixed phase reactor effluent and heat the pressurized aqueous waste feed stream to thereby form the supercritical aqueous waste feed stream;

separating the pressurized mixed phase reactor effluent to form a pressurized gas phase reactor effluent stream and a pressurized liquid phase reactor effluent stream, the pressurized liquid phase reactor effluent stream comprising $H_2O$;

exchanging pressure between the pressurized liquid phase reactor effluent stream and an aqueous waste feed stream to depressurize the pressurized liquid phase reactor effluent stream and pressurize the aqueous waste feed stream and form the pressurized aqueous waste feed stream; and inletting the pressurized gas phase reactor effluent stream to a turbine or other gas expander to drive the turbine or other gas expander and generate work, wherein the work is used to compress the air stream.

22. A method comprising:

compressing an oxidant stream to form a compressed oxidant stream;

generating, in a reactor, waste solids and a reactor effluent from a waste feed stream and the compressed oxidant stream; and expanding at least a portion of the reactor effluent to generate work, further comprising exchanging heat between a pressurized waste feed stream, the reactor effluent, and a pressurized gas reactor effluent stream to thereby heat the pressurized waste feed stream to form the waste feed stream and cool the reactor effluent to form a pressurized mixed phase reactor effluent.

23. The method of claim 22, wherein the reactor effluent is at sub-supercritical pressure.

* * * * *